US010732893B2

(12) United States Patent
Bolkhovitin et al.

(10) Patent No.: US 10,732,893 B2
(45) Date of Patent: Aug. 4, 2020

(54) NON-VOLATILE MEMORY OVER FABRIC CONTROLLER WITH MEMORY BYPASS

(71) Applicant: Western Digital Technologies, Inc., Irvine, CA (US)

(72) Inventors: Vladislav Bolkhovitin, San Jose, CA (US); Warren Fritz Kruger, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 15/683,710

(22) Filed: Aug. 22, 2017

(65) Prior Publication Data

US 2018/0341429 A1 Nov. 29, 2018

Related U.S. Application Data

(60) Provisional application No. 62/511,323, filed on May 25, 2017.

(51) Int. Cl.
*G06F 12/00* (2006.01)
*G06F 13/00* (2006.01)
(Continued)

(52) U.S. Cl.
CPC .............. *G06F 3/0659* (2013.01); *G06F 3/06* (2013.01); *G06F 3/067* (2013.01); *G06F 3/0611* (2013.01);
(Continued)

(58) Field of Classification Search
CPC .... G06F 3/0659; G06F 3/0611; G06F 3/0656; G06F 3/067; G06F 15/17331
(Continued)

(56) References Cited

U.S. PATENT DOCUMENTS 6,008,987 A 12/1999 Gale et al.
9,959,203 B2 * 5/2018 Sabol ................. G06F 12/0246
(Continued)

FOREIGN PATENT DOCUMENTS

DE 102005063281 7/2007
EP 2066158 6/2009
(Continued)

OTHER PUBLICATIONS

International Search Report and Written Opinion dated Nov. 22, 2017 in International Patent Application No. PCT/US2017/050194, which corresponds to U.S. Appl. No. 15/491,915, 14 pages (Van Assche).
(Continued)

*Primary Examiner* — Sheng Jen Tsai
(74) *Attorney, Agent, or Firm* — Morgan, Lewis & Bockius LLP

(57) ABSTRACT

A system and method improve the performance of non-volatile memory storage by facilitating direct memory access (DMA) transfers between a remote host and a non-volatile memory based storage system, such as a flash memory based data storage device (e.g., a solid state drive (SSD)). In conjunction with reading from and writing to non-volatile memory storage, a memory buffer on the non-volatile memory system is allocated, and a read or write command is translated to point to the allocated buffer. Thereafter, read and write operations may be performed through a controller, such as a non volatile memory express (NVMe) controller, using remote direct memory access (RDMA) transfers, thus bypassing time consuming processor steps of buffering data to main memory and allowing bi-directional throughput to reach network and SSD speeds.

22 Claims, 12 Drawing Sheets

(51) Int. Cl.
*G06F 3/06* (2006.01)
*G06F 15/173* (2006.01)
*G06F 13/28* (2006.01)

(52) U.S. Cl.
CPC ............ *G06F 3/0656* (2013.01); *G06F 13/28* (2013.01); *G06F 15/17331* (2013.01)

(58) Field of Classification Search
USPC ........................................................ 711/103
See application file for complete search history.

(56) References Cited

U.S. PATENT DOCUMENTS

| | | | | |
|---|---|---|---|---|
| 2006/0045005 | A1* | 3/2006 | Blackmore | H04L 1/0079 |
| | | | | 370/216 |
| 2008/0236791 | A1 | 10/2008 | Wayman | |
| 2009/0292861 | A1* | 11/2009 | Kanevsky | G06F 3/061 |
| | | | | 711/103 |
| 2010/0083247 | A1* | 4/2010 | Kanevsky | G06F 13/28 |
| | | | | 718/1 |
| 2012/0124312 | A1 | 5/2012 | Vemuri et al. | |
| 2012/0170224 | A1 | 7/2012 | Fowler et al. | |
| 2014/0025877 | A1* | 1/2014 | Talagala | G06F 12/0246 |
| | | | | 711/103 |
| 2014/0258438 | A1* | 9/2014 | Ayoub | G06F 13/28 |
| | | | | 709/212 |
| 2014/0289452 | A1* | 9/2014 | Matsuo | G06F 11/201 |
| | | | | 711/103 |
| 2015/0177986 | A1* | 6/2015 | Kondo | G06F 13/385 |
| | | | | 711/103 |
| 2015/0261434 | A1* | 9/2015 | Kagan | G06F 13/28 |
| | | | | 711/103 |
| 2016/0004642 | A1* | 1/2016 | Sugimoto | G06F 3/06 |
| | | | | 711/128 |
| 2016/0041871 | A1* | 2/2016 | Maeda | G06F 11/1044 |
| | | | | 714/758 |
| 2016/0110270 | A1 | 4/2016 | Iwashita | |
| 2016/0179637 | A1 | 6/2016 | Winokur | |
| 2016/0188482 | A1* | 6/2016 | Cha, II | G06F 12/0895 |
| | | | | 709/203 |
| 2016/0217049 | A1 | 7/2016 | Bali et al. | |
| 2016/0306574 | A1* | 10/2016 | Friedman | G06F 3/0619 |
| 2016/0308968 | A1* | 10/2016 | Friedman | H04L 67/2842 |
| 2016/0344834 | A1* | 11/2016 | Das | H04L 67/2842 |
| 2017/0149890 | A1* | 5/2017 | Shamis | H04L 67/1097 |
| 2017/0185562 | A1* | 6/2017 | Hack | G06N 99/005 |
| 2017/0293589 | A1* | 10/2017 | Ajima | H04L 69/161 |
| 2018/0011764 | A1* | 1/2018 | Akutsu | G06F 3/0619 |

FOREIGN PATENT DOCUMENTS

| | | |
|---|---|---|
| EP | 2395827 | 12/2011 |
| FR | 2560731 | 9/1985 |
| JP | H066064 | 1/1994 |

OTHER PUBLICATIONS

International Search Report and International Written Opinion of International Patent Application PCT/US2015/016656, dated May 18, 2015, 13 pages.

International Patent Application No. PCT/US2018/021785, Notification of Transmittal of the International Search Report and the Written Opinion of the International Searching Authority, or the Declaration, dated Jun. 14, 2018, 12 pages.

"NVM Express 1.2", Nov. 3, 2014, http://nvmexpress.org/wp-content/uploads/NVM_Express_1_2_Gold_20141209.pdf, retrieved on May 22, 2017, 206 pages.

* cited by examiner

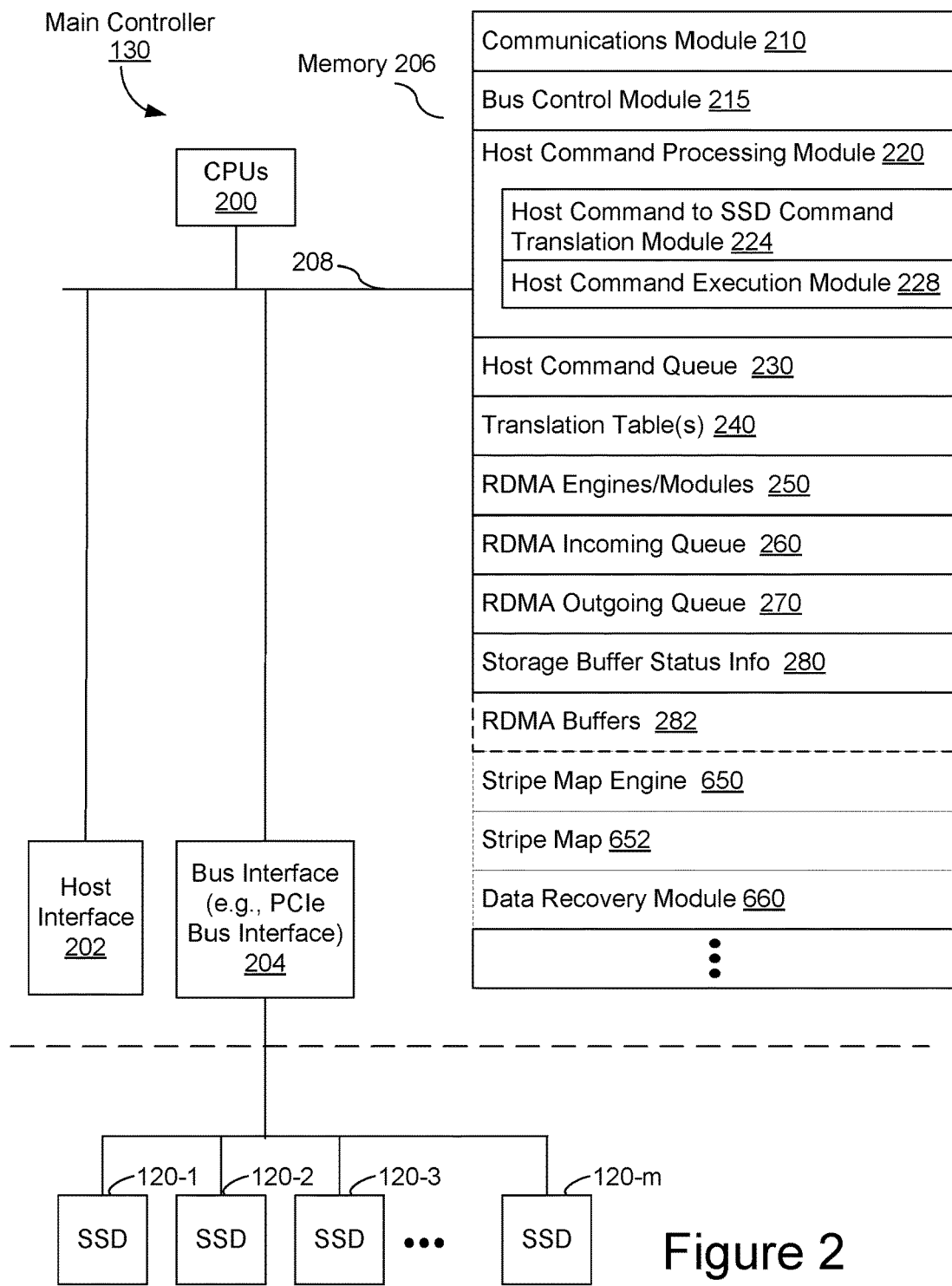
Figure 2
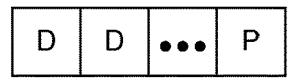
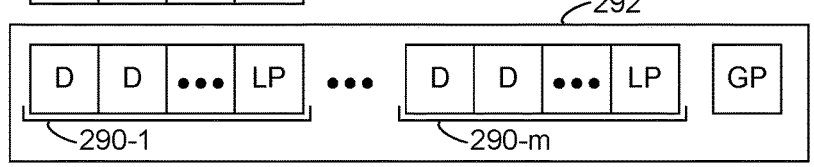

NON-VOLATILE MEMORY OVER FABRIC CONTROLLER WITH MEMORY BYPASS

RELATED APPLICATIONS

This application claims priority to U.S. Provisional Patent Application 62/511,323, filed on May 25, 2017, which is hereby incorporated by reference in its entirety.

TECHNICAL FIELD

The disclosed embodiments relate generally to memory systems, and in particular, to bypassing main memory when reading from and writing to a non-volatile memory system (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. When non-volatile memory systems are implemented in storage networks, such as disaggregated storage networks, central processing unit (CPU) systems are situated between network connected hosts and non-volatile memory to facilitate storage. The CPU systems receive and buffer data in memory, such as DRAM memory, while the data is routed between the network host and the non-volatile memory storage for reading or writing data. The CPU systems and their associated buffers, however, have not been keeping up with the speeds of networks and non-volatile memory storage and have become a bottleneck. Therefore, it would be desirable to bypass relatively slow CPU operations when transferring data bi-directionally between high speed networks and high speed flash memory systems, such as solid state drives.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable bypassing main memory when reading from and writing to a non-volatile memory system.

The disclosed system and method improve the performance of non-volatile memory storage by facilitating direct memory access (DMA) transfers between a remote host and a non-volatile memory based data storage system, such as a flash memory based solid state drive (SSD). In conjunction with reading from and writing to non-volatile memory storage, a memory buffer on the non-volatile memory system is allocated, and a read or write command is translated to point to the allocated buffer. Thereafter, read and write operations may be performed through a controller, such as a non volatile memory express (NVMe) controller, using remote direct memory access (RDMA) transfers, thus bypassing time consuming processor steps of buffering data to main memory and allowing bi-directional throughput to reach network and SSD speeds.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIG. 2 is a block diagram illustrating an implementation of a controller, in accordance with some embodiments.

FIG. 2A shows an example of a Redundancy Coding stripe having one or more parity data storage devices (e.g., SSDs), while FIG. 2B shows an example of a Redundancy Coding stripe having two or more mini-stripes, each mini-stripe having multiple data storage devices and one or more local parity data storage devices, and a global parity data storage device.

Figure 1A:
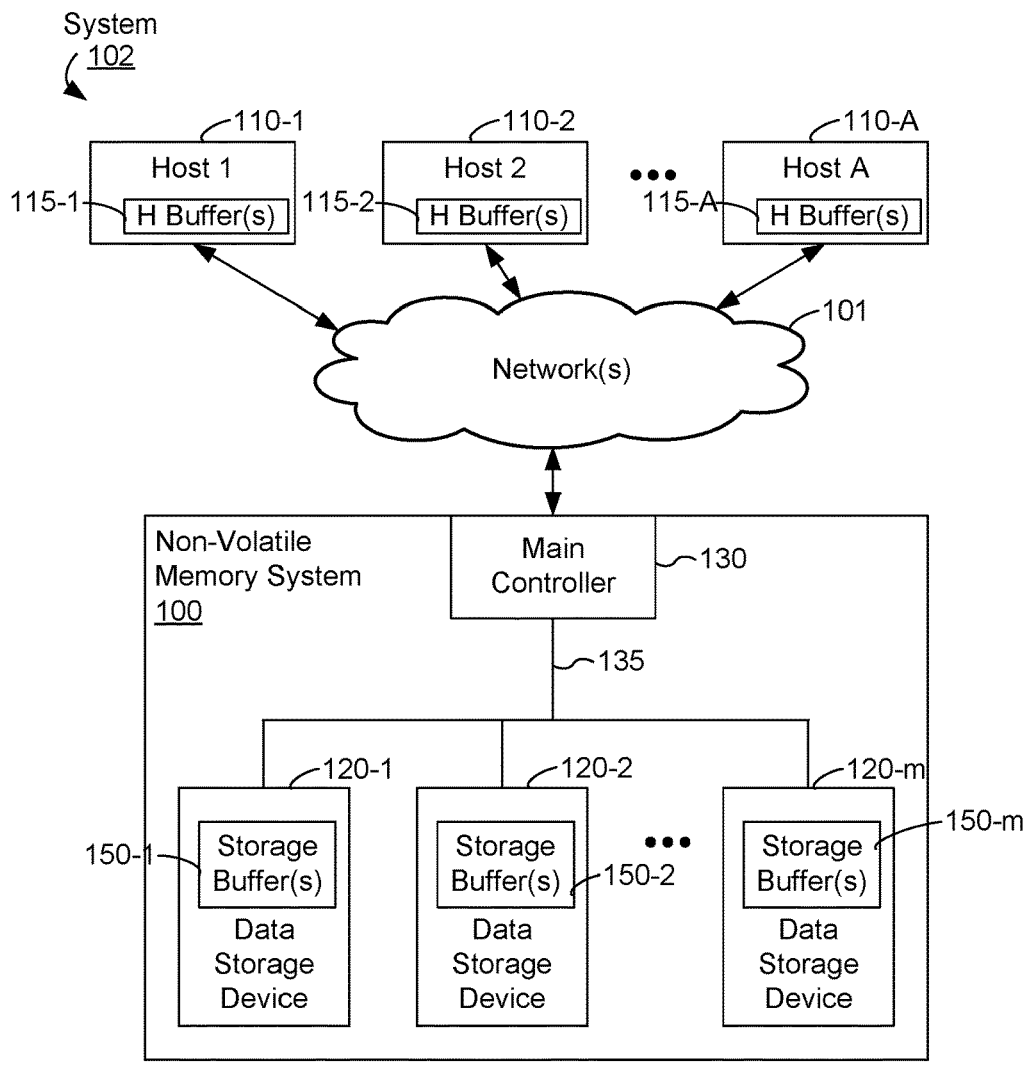
FIG. 1A is a block diagram illustrating a distributed computing system that includes an implementation of a non-volatile memory system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a

DETAILED DESCRIPTION

The various implementations described herein include systems, methods and/or devices used to enable bypassing main memory when reading from and writing to a non-volatile memory system. Some implementations include systems, methods and/or devices to enable higher throughput in data transfers between a host and non-volatile memory systems.

(A1) More specifically, some embodiments include a method of operation in a non-volatile memory system. The method includes, in conjunction with processing memory access requests in a non-volatile memory system having a main controller and a plurality of data storage devices: (1) at the main controller, receiving, from a host device external to the non-volatile memory system, a write request to write data; (2) in response to receiving the write request, the main controller performing a sequence of operations, including (a) identifying a data storage device of the plurality of data storage devices to which to write data, the identified data storage device including a controller, non-volatile memory and a data buffer, (b) allocating buffer space in the data buffer of the identified data storage device for temporarily storing data to be written to the identified data storage device in accordance with the write request, (c) initiating execution of a remote direct memory access (RDMA) data transfer from a memory location in the host device, specified by the write request, to the allocated buffer space in the identified data storage device, (d) generating, based on the write request and allocated buffer space, a write command to be executed by a controller internal to the identified data storage device, and (e) upon completion of the RDMA data transfer, issuing the generated write command to the identified data storage device, and (3) at the identified data storage device, executing the generated write command so as to write data from the allocated buffer space in the data buffer of the identified data storage device to non-volatile memory in the identified data storage device.

(A2) In some embodiments of the method of A1, each data storage device of the plurality of data storage devices in the non-volatile memory system includes non-volatile memory for durably storing information, one or more data buffers for temporarily storing information being written to or read from the non-volatile memory of the data storage device, and a storage controller (e.g., an SSD controller) for controlling operation of the data storage device, including execution of read and write commands.

(A3) In some embodiments of the method of A2, the non-volatile memory of each data storage device of the plurality of data storage devices comprises flash memory, and the one or more data buffers of each data storage device of the plurality of data storage devices comprises non-volatile RAM.

(A4) In some embodiments of the method of any of A1-A3, the write request is a first write request, the host device is a first host device, the identified data storage device is a first identified data storage device and the RDMA data transfer is a first RDMA data transfer, and the method further comprises, at the main controller: (1) receiving, from a second host device external to the non-volatile memory system, a second write request to write data, and (2) in response to receiving the second write request, performing a sequence of operations at the main controller, including initiating execution of a second remote direct memory access (RDMA) data transfer from a memory location in the second host device, specified by the second write request, to buffer space in a second identified data storage device, wherein execution of the second RDMA data transfer overlaps execution of the first RDMA data transfer.

(A5) In some embodiments of the method of A4, wherein the main controller is configured to concurrently execute four or more overlapping RDMA data transfers, each RDMA data transfer comprising an RDMA transfer of data between a respective host device and a respective data storage device of the plurality of data storage devices.

(A6) In some embodiments of the method (A1-A5), wherein the write command generated by the main controller includes a source location corresponding to the allocated buffer space.

(A7) In some embodiments of the method (A1-A6), including identifying the identified data storage device in accordance with a name space specified by the received write request.

(A8) In some embodiments of the method (A1-A3) the write request is a first write request, the host device is a first host device, the identified data storage device is a first identified data storage device and the RDMA data transfer is a first RDMA data transfer, the method further comprising, at the main controller: (1) receiving, from a second host device external to the non-volatile memory system, a read request to read data, (2) in response to receiving the read request, performing a sequence of operations at the main controller, including: (a) identifying a second data storage device of the plurality of data storage devices from which to read data, the identified data storage device including a controller, non-volatile memory and a data buffer, (b) allocating buffer space in the data buffer of the second identified data storage device for temporarily storing data read from the identified data storage device in accordance with the read request, (c) generating, based on the read request and allocated buffer space, a read command to be executed by a controller internal to the second identified data storage device, and (d) issuing the generated read command to the second identified data storage device, and (3) after execution of the read command by the second identified data storage device, initiating execution of a second remote direct memory access (RDMA) data transfer from the allocated buffer space in the second identified data storage device to a memory location in the second host device specified by the read request.

(A9) In some embodiments of the method of A8, execution of the second RDMA data transfer from the allocated buffer space in the second identified data storage device to a memory location in the second host device overlaps with execution of the first RDMA data transfer from the first host device to the first identified data storage device.

(A10) In some embodiments of the method of any of A8-A9, the read command generated by the main controller includes a target location corresponding to the allocated buffer space in the data buffer of the second identified data storage device.

(A11) In another aspect, a memory controller includes (1) a storage interface for coupling the memory controller to a plurality of data storage devices, (2) a host interface for receiving, from one or more host devices external to the memory controller, write requests and read requests, each write request comprising a request to write data from a respective host device to a respective data storage device, and each read request comprising a request to read data from a respective data storage device and convey the read data to a respective host device; and (3) a write request processing module for processing a respective write request from a respective host device by performing a sequence of operations. The sequence of operations includes (a) identifying a data storage device of the plurality of data storage devices to which to write data, the identified data storage device including a controller, non-volatile memory and a data buffer, (b) allocating buffer space in the data buffer of the identified data storage device for temporarily storing data to be written to the identified data storage device in accordance with the write request, (c) initiating execution of a remote direct memory access (RDMA) data transfer from a memory location in the respective host device, specified by the respective write request, to the allocated buffer space in the identified data storage device, (d) generating, based on the respective write request and allocated buffer space, a write command to be executed by a controller internal to the identified data storage device, and (e) upon completion of the RDMA data transfer, issuing the generated write command to the identified data storage device; and (f) at the identified data storage device, executing the generated write command so as to write data from the allocated buffer space in the data buffer of the identified data storage device to non-volatile memory in the identified data storage device.

(A12) In some embodiments, the memory controller of A11 is configured to perform the method of any of A2-A10.

Numerous details are described herein to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Even though solid state drives are but one example of the data storage devices discussed in this document, in several of the figures, data storage devices 120 are labeled "SSD" and storage buffers 150 are labeled "SSD buffer 150" or "buffer 150" to conserve space.

FIG. 1A is a block diagram illustrating a distributed system 102 that includes an implementation of a non-volatile memory system 100, coupled over a network 101 to a plurality of host systems 110 (sometimes called host computer systems, host devices, or hosts) in accordance with some embodiments. In some embodiments, non-volatile memory system 100 includes a non-volatile data storage device 120 (also sometimes called an information storage device, or a storage device, or a memory device). Data storage device 120 may include a single flash memory device, or a plurality of flash memory devices that are NAND-type flash memory or NOR-type flash memory. In some embodiments, data storage device 120 includes one or more three-dimensional (3D) non-volatile memory devices. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, non-volatile memory system 100 (sometimes called a data storage system) includes one or more non-volatile data storage devices 120.

In FIG. 1A, host systems 110 are coupled to a main storage controller 130 of non-volatile storage system 100 through network 101. However, in some embodiments a respective host system 110 includes a storage controller, or a portion of main storage controller 130, as a component and/or as a subsystem. For example, in some embodiments, some or all of the functionality of storage controller 130 is implemented by software or hardware within at least one of the host systems 110. A respective host computer system 110 may be any suitable computer device, such as a computer, a laptop computer, a tablet device, a netbook, an interne kiosk, a personal digital assistant, a mobile phone, a smart phone, a gaming device, a computer server, or any other computing device. Each host computer system 110 is sometimes called a host, host system, client, or client system. In some embodiments, a respective host computer system 110 is a server system, such as a server system in a data center. In some embodiments, a respective host computer system 110 includes one or more processors, one or more types of memory, a display and/or other user interface components such as a keyboard, a touch-screen display, a mouse, a track-pad, a digital camera, and/or any number of supplemental I/O devices to add functionality to host computer system 110. In some embodiments, host computer system 110 does not have a display and other user interface components.

Within the illustrative non-volatile memory system 100, a main controller 130 is coupled to network 101 and to one or more data storage devices 120 through connections 135. Main controller 130 is a controller for controlling access to data storage devices 120 and bi-directional processing of read and write commands and associated data between networked host systems 110 and data storage devices 120, such as solid state disk drives (SSDs). The controller may be a non-volatile memory express (NVMe) controller, a Redundancy Coding controller (e.g., a redundant array of independent disks (RAID) controller), or as described in further detail below another type of CPU or processor for controlling access to non-volatile storage devices. Network 101 and connections 135 are sometimes called data connections, but typically convey commands in addition to data, and optionally convey metadata, error correction information and/or other information in addition to data values to be stored in data storage devices 120 and data values read from data storage devices 120. In some embodiments, however, controller 130 and data storage devices 120 are included in the same device (i.e., an integrated device) as components thereof. Furthermore, in some embodiments, data storage devices 120 are embedded in a host device (e.g., computer system 110), such as a mobile device, tablet, other computer or computer controlled device, and the methods described herein are performed, at least in part, by the embedded storage controller.

In some embodiments, data storage devices 120 include any number (i.e., one or more) of memory devices including, without limitation, persistent memory or non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Data storage devices 120 further include buffers 150 (sometimes called storage buffers) that may be allocated by the main controller 130 as part of its directly accessible memory space for use when writing data to or reading data from data storage devices 120 using remote DMA operations. Similarly, a host system 110 may include a host buffer 115 that is directly accessible by the main controller 130 during remote DMA operations.

Figure 3:
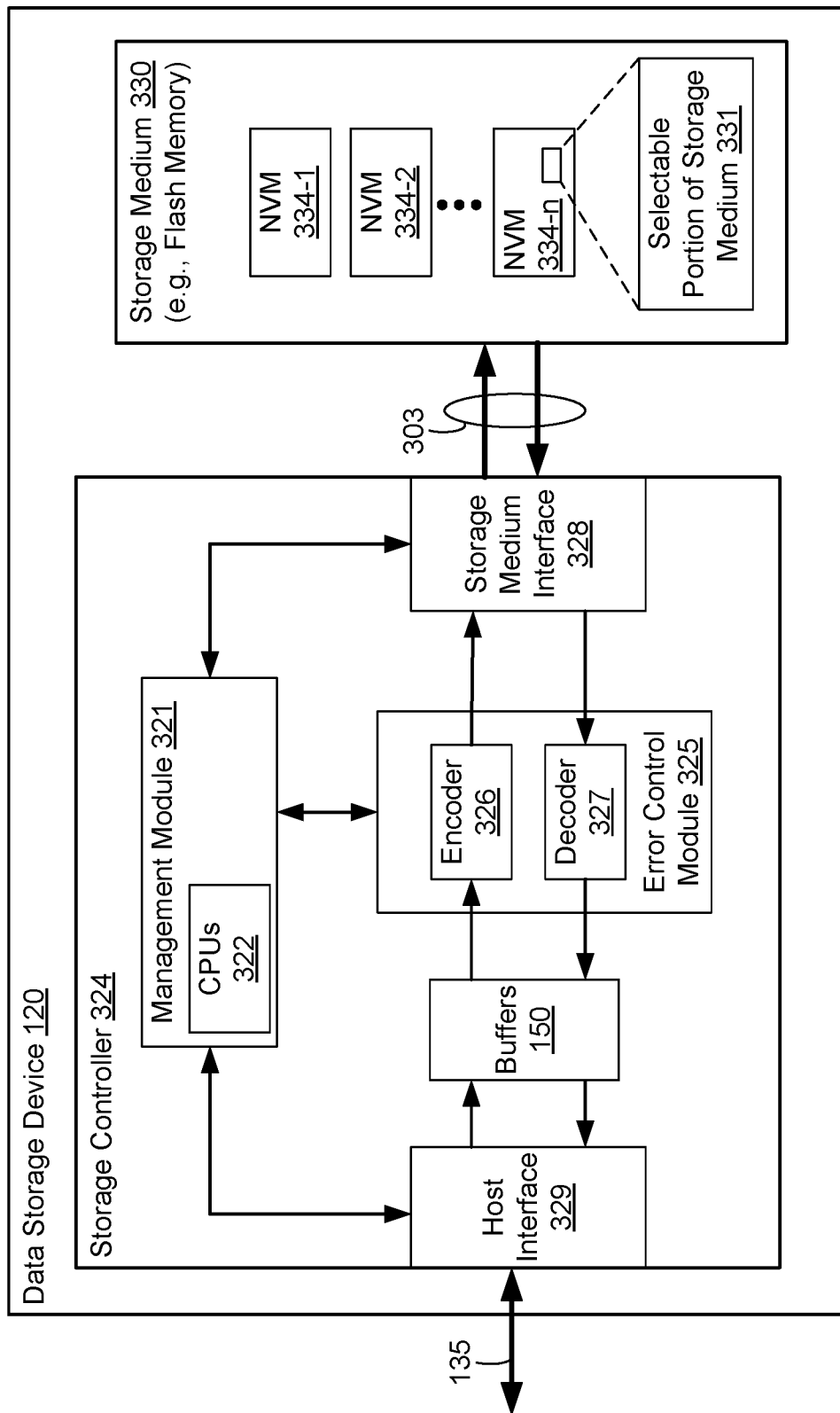
FIG. 3 is a block diagram of a data storage device that is part of a non-volatile memory system, in accordance with some embodiments.

Referring to FIG. 3, each data storage device 120 includes a storage controller 324 (e.g., a solid state drive controller, sometimes called an SSD controller) and a storage medium 330. Storage medium 330 includes memory devices (e.g., NVM 334-1, NVM 334-2, etc.), each of which include addressable and individually selectable blocks. Storage medium 330 includes individually selectable portions 331 (also referred to herein as a selected portion 331). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing data to or reading data from the flash memory device.

In some embodiments, storage controller 324 includes a management module 321, a host interface 329, storage buffers 150, an error control module 325 and a storage medium interface 328. Storage controller 324 may include various additional features that have not been illustrated for the sake of brevity and so as not to obscure pertinent features of the example embodiments disclosed herein, and a different arrangement of features may be possible. Host interface 329 provides an interface to the data storage device 120 through data connections 135. Similarly, storage medium interface 328 provides an interface to storage medium 330 though connections 303. In some embodiments, storage medium interface 328 includes read and write circuitry, including circuitry capable of providing reading signals to storage medium 330 (e.g., reading threshold voltages for NAND-type flash memory).

In some embodiments, storage buffers 150 are implemented using non-volatile random access memory (sometimes called non-volatile RAM or NVRAM), such as battery-backed dynamic random access memory (DRAM). At least some of the storage buffers 150 may be directly accessible to not only the memory management module 321, but also the main controller 130 (FIG. 1A) via data connections 135, which may be any suitable bus or network, and may use any suitable protocol, such as SATA or PCI express. In some embodiments, storage buffers 150 are allocated by the main controller 130 and the data storage device 120 to facilitate remote DMA operations between a host 110 and a data storage device 120.

In some embodiments, management module 321 includes one or more processing units 322 (sometimes herein called CPUs, processors, or hardware processors, and sometimes implemented using microprocessors, microcontrollers, or the like) configured to execute instructions in one or more programs (e.g., in management module 321). In some embodiments, the one or more CPUs 322 are shared by one or more components within, and in some cases, beyond the function of storage controller 324. However, in some embodiments, management module 321 does not include any CPUs or processors that execute instructions in one or more programs, and instead includes an application specific integrated circuit (ASIC) or field programmable gate array (FPGA) that implements one or more state machines to perform the functions of management module 321.

Management module 321 is coupled to host interface 329, error control module 325 and storage medium interface 328 in order to coordinate the operation of these components. In some embodiments, one or more modules of management module 321 are implemented by a host computer system 110. Management module 321 is coupled to storage medium 330, via storage medium interface 328, in order to manage the operation of storage medium 330.

Error control module 325 is coupled to storage medium interface 328, storage buffers 150, and management module 321. Error control module 325 is provided to limit the number of uncorrectable errors inadvertently introduced into data during writes to memory or reads from memory. In some embodiments, error control module 325 is executed in software by the one or more CPUs 322 of management module 321, and, in other embodiments, error control module 325 is implemented in whole or in part using special purpose circuitry to perform data encoding and decoding functions. To that end, error control module 325 includes an encoder 326 and a decoder 327. Encoder 326 encodes data by applying an error control code to produce a codeword, which is subsequently stored in storage medium 330.

When the encoded data (e.g., one or more codewords) is read from storage medium 330, decoder 327 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, a respective buffer 150 (sometimes called an input buffer or allocated buffer) receives data to be stored in storage medium 330 from computer system 110 via a remote DMA operation that is controlled by main controller 130 of memory system 100. The data held in the allocated buffer 150 is made available to encoder 326, which encodes the data to produce one or more codewords. The one or more codewords are made available to storage medium interface 328, which transfers the one or more codewords to storage medium 330 in a manner dependent on the type of storage medium being utilized. To initiate the write, the memory management module 321 receives from the main controller 130 a translated write command, which includes information sufficient to transfer the data to be written from the allocated buffer 150 to a location in the storage medium 330. In some embodiments, memory management module 321 includes completion logic that notifies main controller 130 when the data associated with the command has been written from to the allocated buffer 150.

A read operation is initiated when a respective host computer system 110 sends one or more host read commands (e.g., via network 101) to the main storage controller 130, which translates the command and sends the translated command to the storage controller 324 of a respective data storage device 120 (see FIG. 1A), requesting data from storage medium 330. Storage controller 324 sends one or more read access commands to storage medium 330, via storage medium interface 328, to transfer raw read data in accordance with memory locations (addresses) specified by the one or more host read commands. Storage medium interface 328 provides the raw read data (e.g., comprising one or more codewords) to decoder 327. If the decoding is successful, the decoded data is provided to an output buffer 150 allocated by the main controller 130, where the decoded data is made available to computer system 110 via a remote DMA operation using the main controller 130. In some embodiments, if the decoding is not successful, storage controller 324 may resort to a number of remedial actions or provide an indication of an irresolvable error condition. The memory management module 321 may further include completion logic that notifies the main controller 130 when the data associated with the command is in the allocated buffer 150 and ready to be sent directly to the host via RDMA.

Figure 1B:
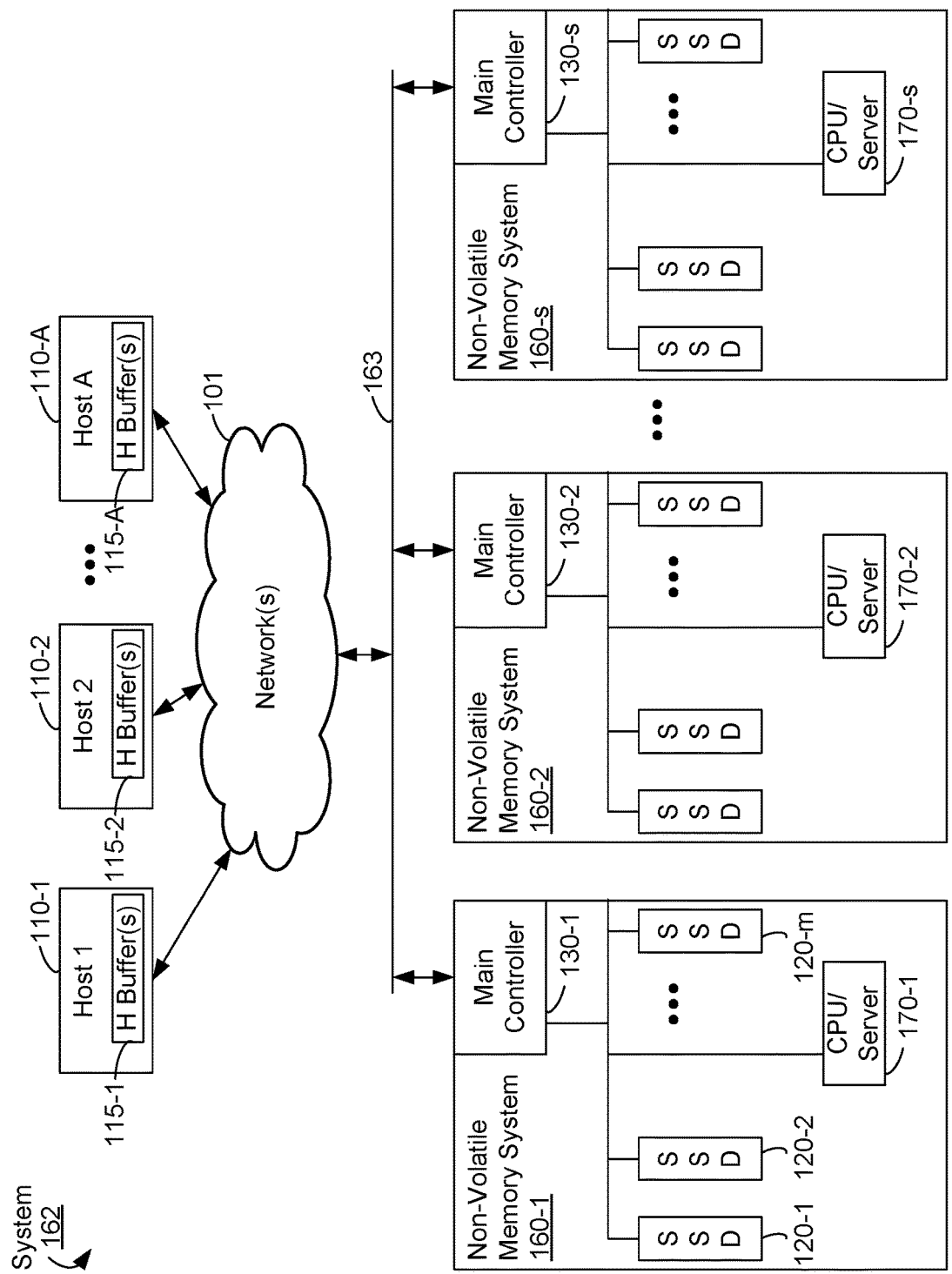
FIG. 1B is a block diagram illustrating a distributed computing system that includes one or non-volatile memory systems that include a compute engine or server, in accordance with some embodiments.

FIG. 1B is a block diagram illustrating a distributed computing system 162 that is similar to distributed system 102 (FIG. 1A). However, system 162 includes one or more non-volatile memory systems 160 that each include a compute engine or server 170, in accordance with some embodiments. Those aspects of system 162 that are the same or similar to system 102, FIG. 1A, have the same reference numbers, and to the extent they are the same as in system 102, will not be discussed again, to avoid needless repetition. As shown in FIG. 1B, system 162 includes two or more non-volatile memory systems 160 (e.g., NVM systems 160-1, 160-2 to 160-s, where s is an integer greater than 1), which are sometimes collectively called storage system 180. In some embodiments, system 162 includes at least one, and in some embodiments, system at least two NVM systems 160 that each include an internal compute engine or server 170. In FIG. 1B, NVM systems 160 are shown as being interconnected by a network or communication bus 163. Functionally, and for purposes of the explanations that follow, network or communication bus 163 is included in network(s) 101. However, in some embodiments, network of communication bus 163 is separate from network(s) 101, and instead is part of storage system 180 instead of network(s) 101.

In some such embodiments, the compute engine/server 170 (e.g., 170-1, 170-2 or 170-s) of the respective NVM system 160 is a compute engine that includes a hardware processor (e.g., a microprocessor, ASIC, state machine, or the like) and working memory (e.g., DRAM, SRAM, or other random access memory), for executing programs sent to it by one or more of hosts 110, herein called the requesting host for ease of explanation. For example, such program may be used to perform data intensive tasks, such as data mining, data analysis, report generation, etc., and to then send the results of those tasks back to the requesting host. In this way, large quantities of data needed for the data intensive tasks need not be transported across network(s) 101 to the requesting host, and instead only the programs and results are transported across network(s) 101.

In some other embodiments, the compute engine/server 170 is a server that includes a hardware processor (e.g., a microprocessor, ASIC, or the like) and working memory (e.g., DRAM, SRAM, or other random access memory), for executing programs, hosting applications, and providing services to client systems (e.g., any of hosts 110, as well as other client systems not shown in FIG. 1B). Thus, each NVM system 160 in such embodiments is an integrated host/server and storage system. In some such embodiments, host systems 110 are embedded in NVM systems 160, implemented using compute engines/servers 170. In some such embodiments, communication bus 163 effectively replaces network 101 for communications between the host systems/servers 170.

In both types of embodiments described above, compute engine/server 170 accesses information in the data storage devices (e.g., SSDs) of its NVM system 160 directly, using standard SSD access protocols, without going through main controller 130. However, to the extent it needs to access information stored in any of the data storage devices 120 of any of the other NVM systems 160, it is functionally the same as a host 110, conveying its request(s) to the other NVM system 160 via network(s) 101 (which incudes network/communication bus 163, as explained above), and the main controller 130 of that NVM system 160.

FIG. 2 is a block diagram illustrating an implementation of a main controller 130, in accordance with some embodiments. In some embodiments, main controller 130 includes one or more processors 200, sometimes called CPUs, or hardware processors, or microcontrollers; host interface 202 for coupling main controller 130 to one or more host systems 110 (FIG. 1A); bus interface 204 for coupling main controller to one or more communication busses (e.g., connections 135, FIG. 1A); memory 206 (sometimes herein called controller memory); and one or more communication buses 208 for interconnecting these components. Communication buses 208 optionally include circuitry (sometimes called a chipset) that interconnects and controls communications between system components.

Main controller 130 generally facilitates getting data into and out of non-volatile memory in data storage devices 120. Main controller 130 exchanges data over network 101 with host systems 110 via host interface 202. In some embodiments, main controller 130 may be a Redundancy Coding controller (e.g., a RAID controller) for storing and accessing data in an array of data storage devices (e.g., data storage devices 120). The one or more processors 200 execute modules, programs and/or instructions stored in memory 206 and thereby perform processing operations. In some embodiments, the one or more processors 200 are coupled to data storage devices 120 by communication buses 208. In other embodiments the coupling is indirect through, for example, bus interface 204, such as a PCI express bus interface. Other bus interfaces, including a SATA bus interface may also be used.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 200. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset or superset thereof:

communications module 210 used for communicating with other components, such as data storage devices 120, and host computer systems 110;

a bus control module 215 used for executing bus protocols and transferring data over busses between components;

a host command processing module 220 that receives read and write commands from host systems 110, allocates storage buffers 150 in data storage devices, and translates the host commands into data storage device commands to facilitate remote DMA transfers of data corresponding to the read and write commands between host buffers on host systems 110 and storage buffers 150 on associated data storage devices 120. To facilitate the translation of host commands, host command processing module 220 may include a host command to data storage device command (e.g., SSD command) translation module 224, which converts host write and read commands into commands suitable for execution by data storage device 120, and optionally facilitates virtualizing addresses embedded in the host commands. Host command processing module 220 may further include a host command execution module 228 that facilitates executing received host commands, for example by setting up and executing remote DMA data transfers, and sending translated data storage device commands to respective data storage devices 120 for execution.

One or more host command queues 230, used to track commands received from hosts 110 and their associated translated commands;

Translation tables 240, used in some embodiments to translate addresses or name spaces in the received host commands into data storage device identifiers or data storage device addresses;

RDMA engines 250, used in some embodiments to transfer data between a host buffer and one or more allocated storage buffers 150 associated with one or more data storage devices 120. The RDMA engines 250 in some embodiments use translated commands, addresses and/or buffer pointers associated with translated commands to accomplish remote direct memory access (RDMA) operations; each RDMA engine 250, once configured with pointers to host and storage device buffers and a counter or other indicator of the quantity of data to be transferred, transfers data between designated host buffers and storage buffers 150 independently of the one or more processors 200;

RDMA incoming queue 260 and RDMA outgoing queue 270. To facilitate RDMA operations, host command processing module 220 and RDMA engines 250 may use RDMA incoming queue 260 and RDMA outgoing queue 270 to keep track of read operations and write operations that have not yet completed, in accordance with some embodiments; and Storage device buffer status information table or data structure 280. To facilitate the allocation of storage buffers 150 in data storage device 120, host command processing module 220 uses a storage device buffer status information table or data structure 280 to keep track of which storage buffers 150 have been allocated and which are available for allocation, in accordance with some embodiments.

In some embodiments, memory 206 of main controller 130 also includes one or more RDMA buffers 282, for temporarily storing data or information being transferred between a host and a data storage device, as discussed below.

Optionally, memory 206 of main controller 130 further includes stripe map engine 650 for determining the non-volatile data storage devices 120 in which to store data and parity information for any given write command or set of write commands, for example when using a particular Redundancy Coding level (e.g., any predefined RAID level such as RAID0 to RAID6, RAID10, RAID01, and so on). In some embodiments, stripe map engine 650 works in conjunction with a stripe map 652 or stripe function for determining the particular data storage devices in which to store data and parity when performing any specified write operation or set of write operations. In some embodiments, main controller 130, when sending a parity generation command to a particular data storage device 120, to generate parity data for specified data, also provides to that data storage device a stripe map or other data structure so that the data storage device knows which other data storage device to forward the specified data to for storage.

In some embodiments, memory 206 of memory controller 130 further includes a data recovery module 660, for recovering data when a data storage device fails or more generally when the data in a portion of a stripe cannot be read from the information stored in the data storage device(s) storing that portion of the stripe.

Each of the above identified elements may be stored in one or more of the previously mentioned memory devices that together form memory 206, and corresponds to a set of instructions and data for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 5A-5D.

Although FIG. 2 shows a main controller 130, FIG. 2 is intended more as a functional description of the various features which may be present in a main controller, or non-volatile memory controller, than as a structural schematic of the embodiments described herein. In practice, and as recognized by those of ordinary skill in the art, items shown separately could be combined and some items could be separated. Further, as noted above, in some embodiments, one or more modules of main controller 130 are implemented by one or more modules of host computer system 110.

In some embodiments, main controller 130 is implemented, at least in part, as a respective data storage device 120 (of the plurality of data storage devices in the storage system 102 or 162), to which has been added the host command processing module 220, host command queue 230, RDMA features 250, 260, 270, 282, and other modules and data structures shown in FIG. 2 for processing host commands. In some of those embodiments, the respective data storage device 120 implementing main controller 130 is also a target for host read requests to read data from that data storage device and host write requests to write data to that data storage device.

Figure 4A:
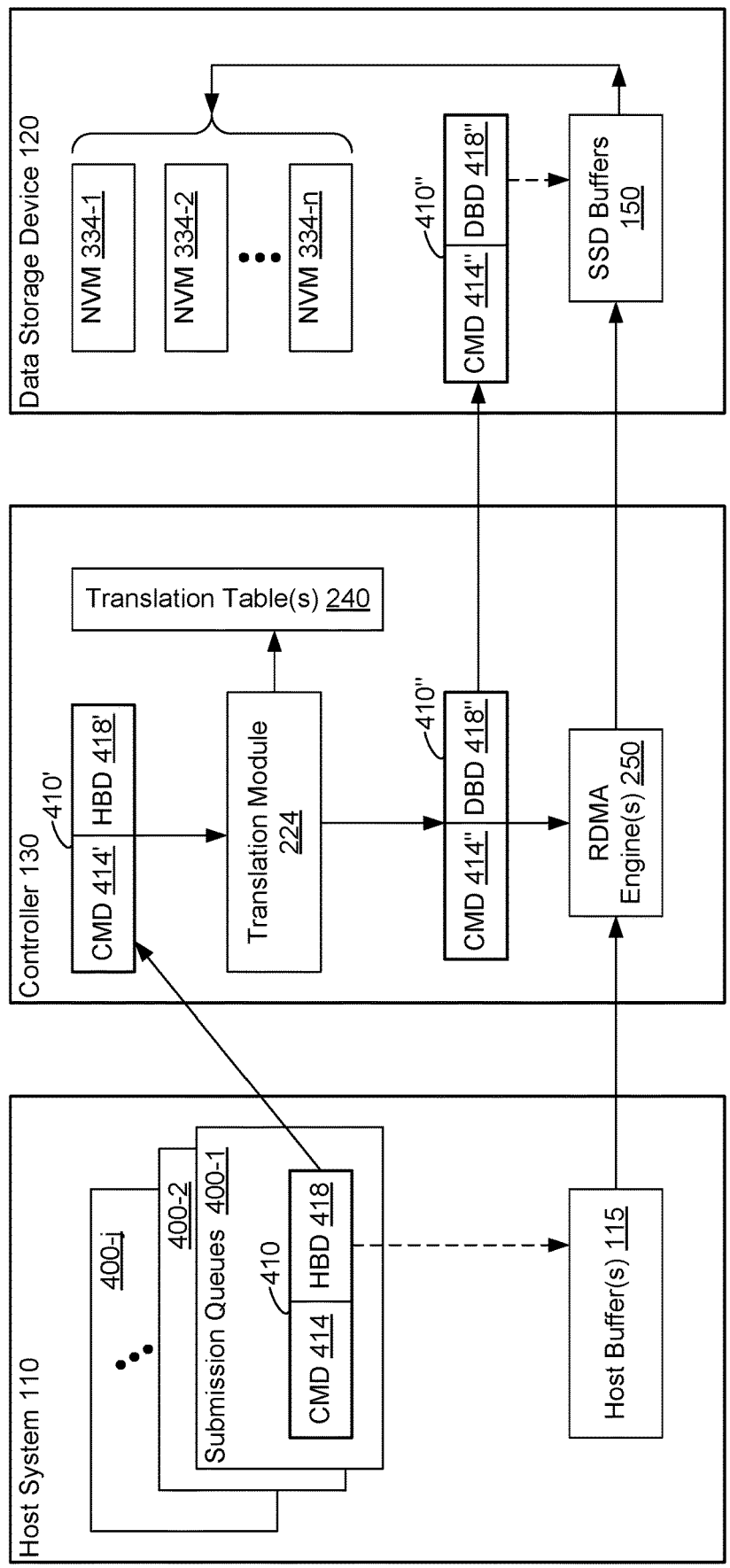
FIG. 4A is a diagram showing some elements of a host system, controller, and data storage device that participate in a remote direct memory access write, in accordance with some embodiments.

FIG. 4A is an illustrative view of several components involved when a host system 110 is writing data to a data storage device 120 according to some embodiments. Referring to FIG. 4A, an illustrative host system 110 includes submission queues 400 that hold commands 410, including read and write commands. When the command 410 is a write command, it includes a command portion 414, and an address portion identifying where the data, sometimes called the write data, residing on the host corresponding to the write command 410 is located. In some embodiments, the write command 410 includes, in addition to command portion 414, a host buffer descriptor 418 that identifies a host buffer 115, or the location of a host buffer 115 that contains the write data to be written to one or more data storage devices 120. Optionally, the command portion 414 includes an address or a logical block address which is sufficient to identify a data storage device 120 to which the write data is to be written. The address information within command 414 may be virtualized or serialized at the host system 110 or main controller 130 after main controller 130 receives the command 410. For example, main controller 130 may perform storage virtualization, index traversing or TLB-based caching, for instance, on the addresses within the command resulting in a modified command 410'.

Main controller 130 is coupled to host system 110 and receives commands 410 (or 410') from the host system to process read and write requests. When a write command 410 is received by main controller 130, main controller 130 may keep the command as is or may modify the command 410 to command 410', as discussed above to virtualize or serialize, for example, certain addresses and/or pointers. After a command 410' has been received and processed, main controller 130 translates the command 410' into command 410". During this translation, the host buffer descriptor ("HBD") 418' is modified to a device buffer descriptor ("DBD") (418"). In some embodiments, the DBD 418" corresponds to an allocated storage buffer 150, which is allocated by main controller 130 and/or the data storage device 120 as part of the process of translating the command. Alternatively, the DBD 418" may point to part of a storage buffer 150 that has already been allocated as part of the operation of main controller 130 and one or more data storage devices 120. The allocated storage buffer 150 corresponding to DBD 418" has an address range that is addressable by the RDMA Engine(s) 250 within main controller 130.

Main controller 130 is further coupled to data storage devices 120. During a write operation, after a host command is received and translated, and a storage buffer 150 is allocated, main controller 130 performs a direct transfer of data from the Host Buffer 115 to the allocated storage buffer 150 using RDMA. This is possible because both the Host Buffer 115 and the allocated storage buffer 150 are within the directly accessible address space of the controller 130. The translated command 410" is provided to the data storage device 120, with the buffer descriptor now pointing to the storage buffer 150. The translated command 410" is typically provided to the data storage device 120 after the data transfer is completed, but optionally could be provided before or during the data transfer, so long as the data storage device 120 is configured to defer execution of the translated command 410" until after the data transfer is completed. Because the allocated storage buffer 150 is within the direct memory address space of the data storage device 120, the translated command 410" may be executed to directly write data from the storage buffer 150 into the non-volatile memory media of (or associated with) data storage device 120.

While this example has been described with respect to interactions between a memory controller 130 and a single data storage device 120, it will be understood that a command may specify writing data into multiple storage devices, and that in such cases storage buffers 150 corresponding to such other storage devices would be allocated on those data storage devices and translated commands would be transferred to those data storage device to accomplish storing the data into the storage media of those data storage devices 120. The data storage devices may further communicate command completion information (not shown in this figure) that is propagated back through the controller to the host system 110 so that the host system 110 knows when the data has been stored into the data storage device(s) 120.

The write command described above is one that specifies a memory location on the host 110 for data that is to be written into a data storage device 120. Alternatively, the data to be written may be included in the command as part of a write immediate command. This is shown in FIG. 4C. In this case, the command includes data 428 instead of a host buffer descriptor 418. After the write immediate command 410 is received, a storage buffer 150 is allocated, and the immediate data 428 is directly written into the allocated storage buffer 150 specified by the DBD 418" in the translated command 410". Subsequently, when the translated command 410" is sent to the data storage device 120, the data is then written from the storage buffer 150 into a data storage device's storage medium.

Figure 4B:
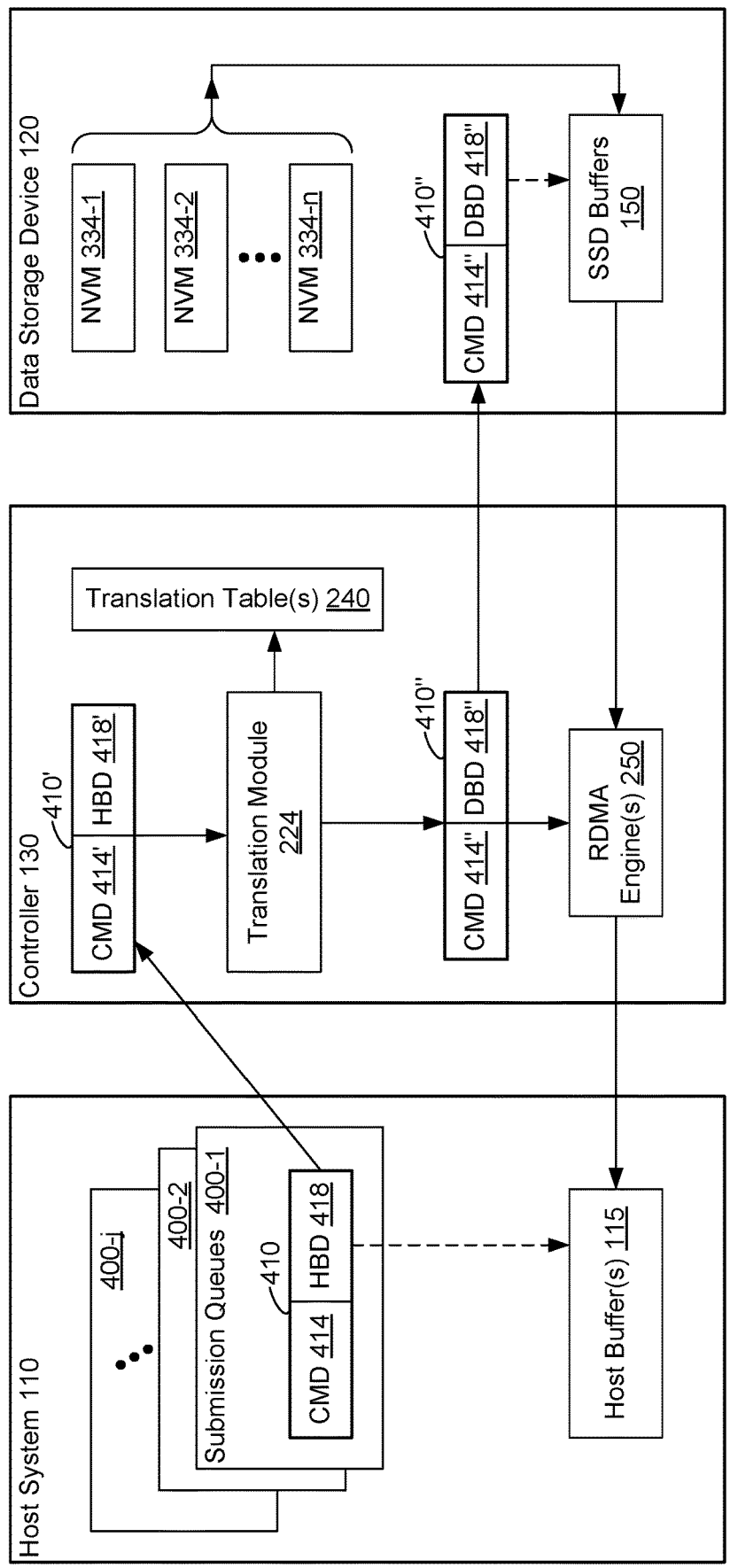
FIG. 4B is a diagram showing some elements of a host system, controller, and data storage device that participate in a remote direct memory access read, in accordance with some embodiments.
Figure 4C:
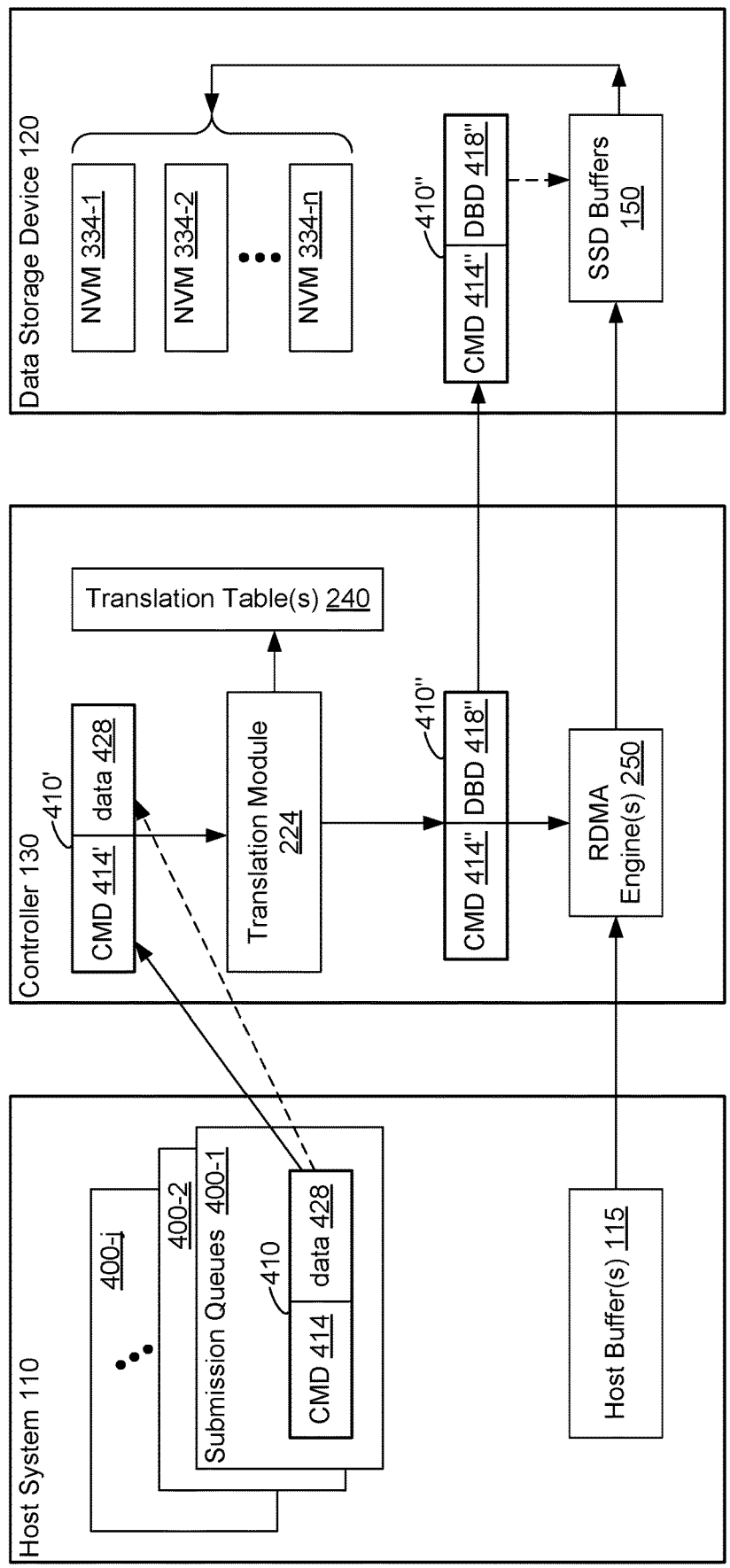
FIG. 4C is a diagram showing some elements of a host system, controller, and data storage device that participate in a remote direct memory access write immediate, in accordance with some embodiments.

FIG. 4B shows illustrative aspects of a read command issued by a host to a data storage device 120 through main controller 130. Similar to the earlier two figures, the read command 410 is sent to main controller 130. The addresses and pointers within the read command 410 may be translated to produce a modified command 410', with modifications related to storage virtualization actions, such as index traversing or TLB-based cashing to identify the target media 330 that will be read. This may be performed by main controller 130, including by the translation module or may be performed elsewhere in main controller 130 or on the host system 110. Translation module 224 also allocates a storage buffer 150 on one or more data storage devices 120 that are associated with the read command. Translation module 224 translates the command 410' into translated command 410," having a translated command 414" and a buffer descriptor 418". The host buffer descriptor 418 in the read command 410 is changed to a device buffer descriptor (DBD) 418" in the translated command 410".

During a read operation, translated command 410", which includes a pointer or other value indicating the allocated storage buffer 150, is provided to the data storage device. The allocated storage buffer 150, specified by the translated command, is the internal location within the data storage device 120 to which the read data is copied from the data storage device's storage medium. Accordingly, the data storage device 120 reads the data from storage locations specified by (if physical addresses are specified by the translated command) or corresponding to (if logical addresses are specified by the translated command) the translated command, within the data storage device's storage medium, to the specified storage buffer 150. When execution of the translated command 410" or relevant portion of the translated command 410" is completed, main controller 130 executes a remote DMA operation to transfer the read data directly from the allocated buffer 150 to the host buffer 115. This is possible because the allocated storage buffer 150 is directly accessible by the RDMA engine 250.

Additional details concerning the process of carrying out read and write commands are presented below with reference to FIGS. 5A-5D. FIGS. 5A-5D illustrate a flowchart representation of a method of translating commands to facilitate high speed reads and writes to data storage devices 120 from hosts 110 using a controller 130.

Figure 5A:
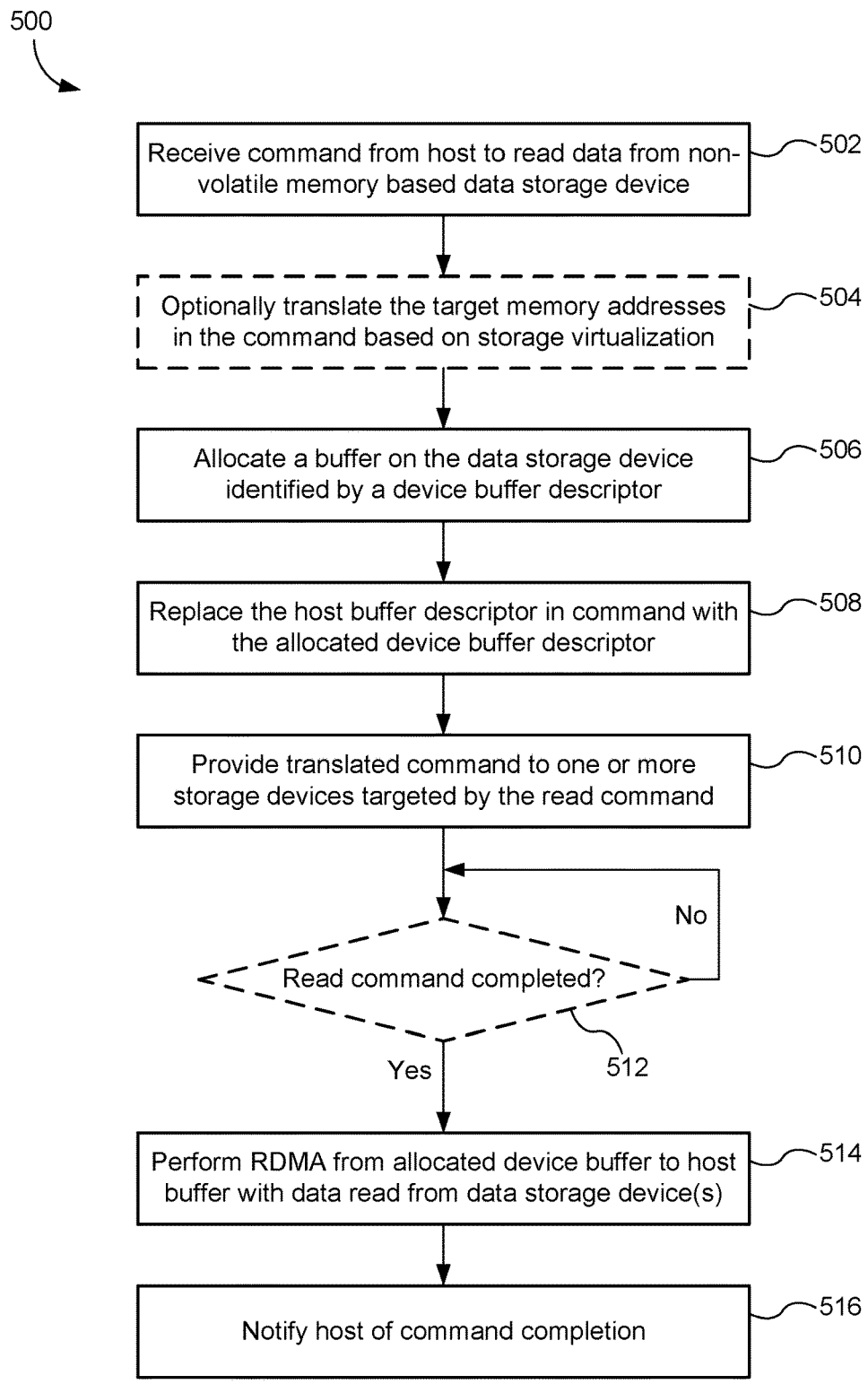
FIGS. 5A-5B illustrate a flowchart representation of a method of reading and writing, respectively, to a data storage device in accordance with some embodiments.
Figure 5B:
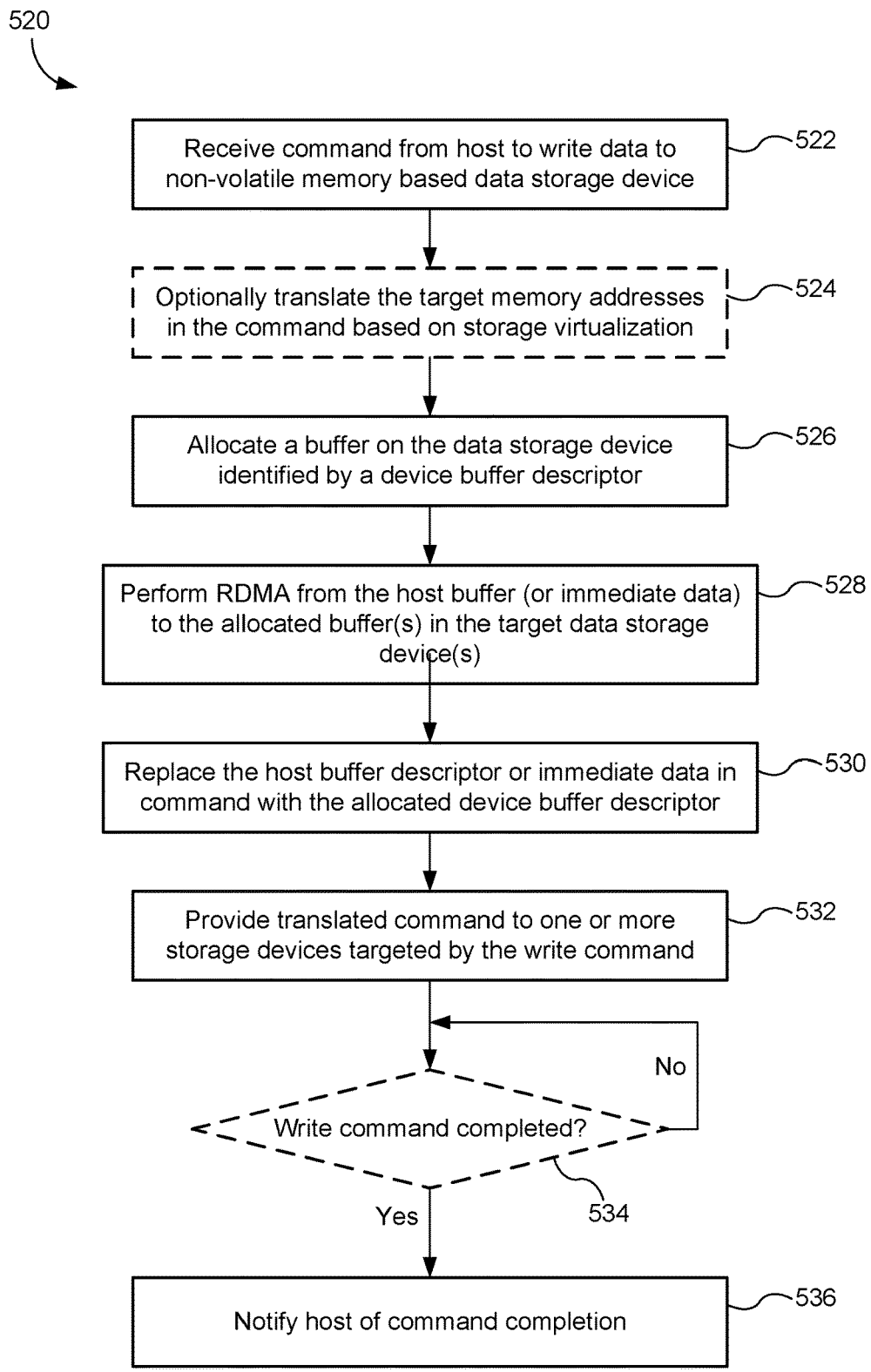

FIGS. 5A and 5B depict flow charts of methods of reading and writing from and to a non-volatile memory data storage device using a controller 130, such as an NVMe controller, a RAID controller or another controller type as described herein. Referring to FIG. 5A, method 500 may be implemented on a host 110, within a controller 130 or within a data storage device, or portions of the method may be implemented among these devices. For ease of explanation, but without loss of generality, method 500 is described as being performed by a controller 130 logically positioned between one or more host computer systems and a set of data storage devices, as shown in FIG. 1A. A read command is received (502) from a host computer system (e.g., a host 110, FIG. 1A), or a host command queue, to read data from a non-volatile memory-based data storage device 120. The read command specifies one or more memory addresses, corresponding to storage locations in the data storage device 120, from which data is to be read. The one or more memory addresses may include a name space indicator, and may include one or more logical block addresses in a logical address space of the host computer system. The one or more memory addresses are sometimes called target memory addresses. Optionally, the controller translates (504) the target memory addresses, according to storage virtualization or other translation protocols, to indicate or identify the target data storage device from which data is to be read. In some embodiments, the target memory addresses are translated in part by the controller and in part by the target data storage device. For example, in some embodiments the controller translates a namespace portion of the target memory addresses into a target data storage device indicator, while the target data storage device translates a logical block address portion of the target memory addresses into physical addresses in a physical address space of the target data storage device.

A buffer 150 on the target data storage device is allocated (506) and identified by a device buffer descriptor, which forms a portion of a translated read command generated from the received read command. In some embodiments, the allocation occurs after the read command is received, while in other embodiments the buffer is pre-allocated, prior to receipt of the read command. In some embodiments, the received read command is cloned and the host buffer descriptor in the command is replaced (508) with a device buffer descriptor corresponding to the allocated buffer within the target data storage device 120.

As described above, in some circumstances, a received host read command may specify target storage locations in multiple target data storage devices, and in such circumstances, buffers 150 are allocated in each of the target data storage devices. In some embodiments, in such circumstances the controller clones the received host read command so as to produce one cloned command per target data storage device 120, each with a device buffer descriptor specific to that data storage device 120.

The translated command is provided (510) to the one or more target data storage devices. This causes the data storage devices to read data from the non-volatile media associated with the read command addresses, and to write that data into the buffers allocated and specified by the device buffer descriptors (DBDs). When execution of the read command is completed (512) by the target data storage device(s), one or more RDMA data transfers are performed (514) between the buffer(s) in the target data storage device(s) and the host buffer identified by the host buffer descriptor. The RDMA data transfer is typically performed by or initiated by main controller 130, but in other embodiments could be initiated by the host computer system or the target data storage devices. The host is then notified of completion (516) of the read command.

Referring to FIG. 5B, method 520 may be implemented on a host 110, within a controller 130 or within a data storage device, or portions of the method may be implemented among these devices. For ease of explanation, but without loss of generality, method 520 is described as being performed by a controller 130 logically positioned between one or more host computer systems and a set of data storage devices, a shown in FIG. 1A. A write command (sometimes herein called a write request) is received (522) from a host computer system 110, or a host command queue, to write data to a data storage device 120. The write command specifies one or more memory addresses, corresponding to storage locations in the data storage device 120, to which data is to be written. The one or more memory addresses may include a name space indicator, and may include one or more logical block addresses in a logical address space of the host computer system. The one or more memory addresses are sometimes called target memory addresses. Optionally, the controller translates (524) the target memory addresses, according to storage virtualization or other translation protocols, to indicate which target data storage device to which data is to be written. In some embodiments, the target memory addresses are translated in part by the controller and in part by the target data storage device. For example, in some embodiments the controller translates a namespace portion of the target memory addresses into a target data storage device indicator, while the target data storage device translates a logical block address portion of the target memory addresses into physical addresses in a physical address space of the target data storage device.

A buffer 150 on the target data storage device is allocated (526) and identified by a device buffer descriptor. In some embodiments, the allocation occurs after the write command is received, while in other embodiments the buffer is pre-allocated, prior to receipt of the write command. As described above, in some circumstances, a received host write command may specify target storage locations in multiple target data storage devices, and in such circumstances, buffers 150 are allocated in each of the target data storage devices.

An RDMA data transfer is performed (528) between the host data buffer 115 and the allocated buffer(s) 150 in the target data storage device(s) involved in the write operation. The RDMA data transfer is typically performed by or initiated by main controller 130, but in other embodiments could be initiated by the host computer system or the target data storage devices. The result is that the data to be written is transferred to buffers 150 with the target data storage device(s) 120. When the command is a write immediate command, the data is transferred from memory storing the command directly to the targeted buffer(s) within the data storage device(s).

Optionally, for example in some circumstances, execution of the RDMA data transfer (528) performed for the received write command overlaps with execution of the RDMA data transfer (514) for the read command (see method 500, FIG. 5A).

The received write command is cloned and the host buffer descriptor (or immediate data in the case of a write immediate) in the command is replaced (530) with a device buffer descriptor corresponding to the allocated buffer 150 within the target data storage device 120. As described above, in some circumstances, a received host write command may specify target storage locations in multiple target data storage devices, and in such circumstances, the controller clones the write command so as to produce one cloned command per target data storage device 120, each with a device buffer descriptor specific to that data storage device 120.

The translated write command(s) 532 is(are) provided to the targeted data storage device(s) 120. Subsequently, each targeted data storage device executes the translated write command, which causes the targeted data storage device to the write the data in the allocated buffer to locations in the non-volatile media specified by or corresponding to the address information in the write command. When execution of the write command by the targeted data storage device is completed (534), a notification is sent (536) to the host.

In some embodiments, main controller 130 is configured to receive write and read requests at a much faster rate than those requests can be processed, and consequently main controller 130 temporarily stores received write requests and read requests in host command queue 230 (FIG. 2). In some embodiments, host command queue 230 is configured to store more than 100 pending write and read requests, and is typically configured to store several hundred (e.g., 300 or more) pending write and read requests. Main controller 130 processes requests from the host command queue 230, issues corresponding memory access commands to the data storage devices 120 and initiates corresponding RDMA data transfers. In some embodiments, non-volatile memory system 100 or 160 is configured to perform or execute 10 or more, or 50 or more, or 100 or more storage access commands, including the RDMA data transfers for those storage access commands, in parallel (e.g., concurrently, or during overlapping time periods).

For ease of reference, the host write command, sometimes called a write request, received by the main controller at 522 is a first write request, the host device from which the host write command is received is a first host device, the identified data storage device is a first identified data storage device, the RDMA data transfer is a first RDMA data transfer. In some embodiments, or in some circumstances, method 520 further comprises receiving, from either the first host device or a second host device external to the non-volatile memory system, a second write command (sometimes called a second write request) to write data. In response to receiving the second write command, the main controller performs a sequence of operations, including initiating execution of a second remote direct memory access (RDMA) data transfer from a memory location in the first or second host device (depending on the host device from which the second write command was received), specified by the second write command, to buffer space in a second identified data storage device, wherein execution of the second RDMA data transfer overlaps execution of the first RDMA data transfer. In some embodiments, the main controller is configured to concurrently execute multiple overlapping RDMA data transfers (e.g., 2 or more overlapping RDMA data transfers, or 4 or more overlapping RDMA data transfers, or 8 or more overlapping RDMA data transfers, or 50 or more overlapping RDMA data transfers, depending on the implementation), where each RDMA data transfer is an RDMA transfer of data between a respective host device and a respective data storage device of the plurality of data storage devices.

In some embodiments, operations 530 and 532 are aggregated for multiple host write commands, as explained in more detail next. More specifically, in some embodiments, operations 522 to 528 are performed for two or more host write commands, which results in write data being written to multiple buffers or multiple sets of buffers in the target data storage devices. When a predefined condition is reached, a single write command is sent by the main controller to the target data storage device so as to write the data in the multiple buffers to non-volatile storage. In some embodiments, the predefined condition is: the amount of write data in the buffers of a target data storage device meeting a predefined threshold, the amount of available buffer space in the target data storage device falling to predefined level, the passage of a predefined amount of time since write data was written to a buffer in the target data storage device without being written or flushed to non-volatile storage, or the occurrence or detection of a power fail or shutdown event.

As noted above, in some embodiments, memory 206 of main controller 130 also includes one or more RDMA buffers 282, for temporarily storing data or information being transferred between a host and data storage device (e.g., SSD), as discussed below. In particular, in some circumstances or in some embodiments, the above described method 500 or method 520, optionally includes transferring data to one or more RDMA buffers 282 (FIG. 2) in main controller 130 as a waypoint while transferring data between a host system and data storage device. For example, in method 500, for processing a read command from a host system, RDMA operation 514 may include both an RDMA transfer of data from a buffer of the target data storage device to an RDMA buffer 282, and a subsequent RDMA transfer of data (e.g., the same data, or a portion of the same data) from the RDMA buffer 282 to the host buffer identified by the host buffer descriptor of the read command. Similarly, in method 520, for processing a write command from a host system, RDMA operation 514 may include both an RDMA transfer of data from a host buffer 115 of the requesting host to an RDMA buffer 282, and a subsequent RDMA transfer of data (e.g., the same data, or a portion of the same data) from the RDMA buffer 282 to a buffer of the target data storage device.

Figure 5C:
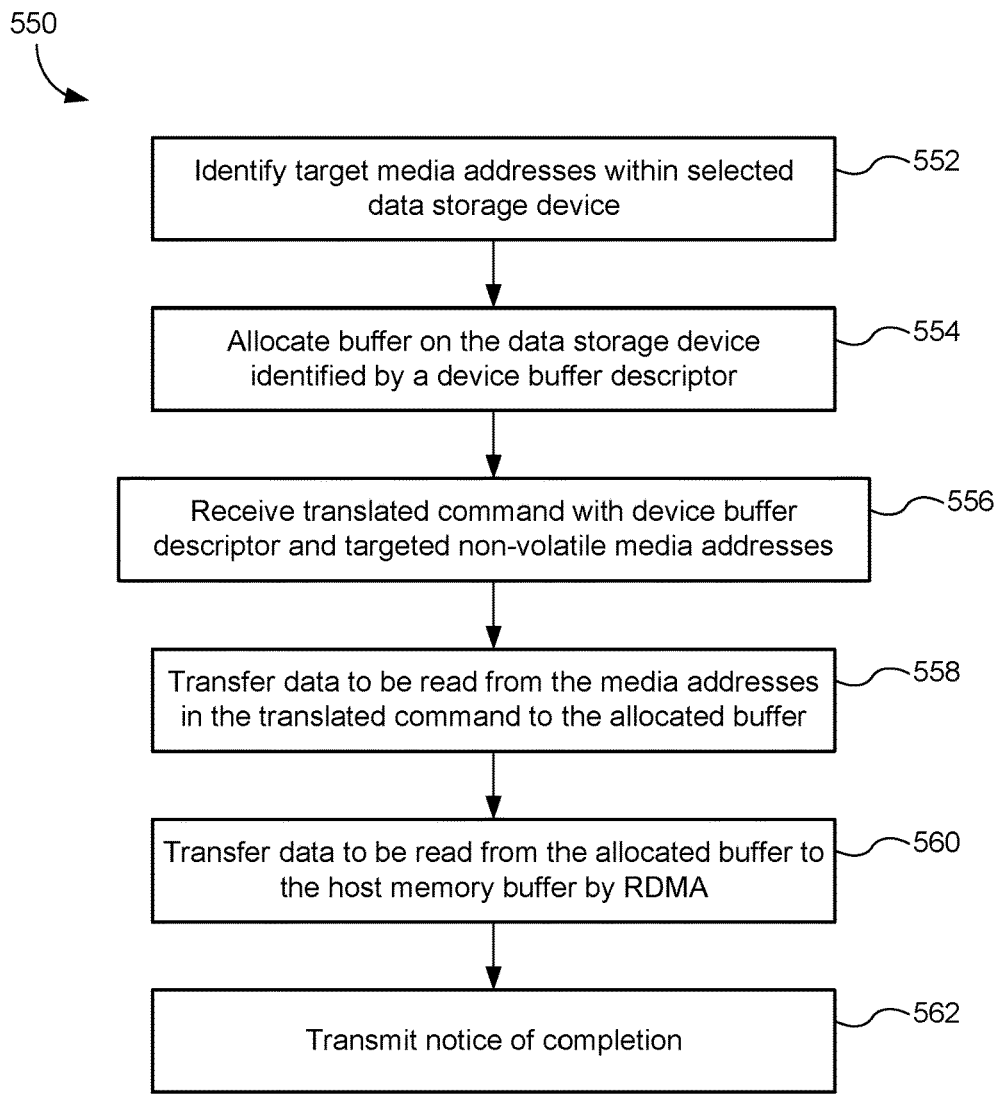
FIGS. 5C and 5D illustrate a flowchart representation of a method performed on a data storage device of reading from and writing to, respectively, the data storage device in accordance with some embodiments.

FIG. 5C illustrates a flowchart of a method 550 of processing a read command (e.g., a read command sent by a host 110, see FIG. 1A) that may be implemented on a data storage device 120 working with a separate main controller 130 (e.g., see FIG. 1A). In method 550, the data storage device receives (552) address information associated with a read command and identifies that it is a target for the read command. The targeted data storage device(s) thereafter allocates (554) a buffer to receive data to be read out of the non-volatile media associated with the targeted addresses of the read command. Alternatively, the buffer may be pre-allocated, prior to receipt of the read command. The data storage device receives (556) a cloned read command specifying the memory addresses in the non-volatile media and the buffer identified by the device buffer descriptor. Thereafter the data is transferred (558) from the non-volatile media to the allocated buffer within the data storage device. Subsequently, the data is further transferred (560), using an RDMA process, directly from the device buffer to the host buffer identified by the host buffer descriptor in the original read command issued by a host computer system 110 and received by the main controller 130. In some embodiments, after data is transferred from the non-volatile media to the allocated buffer within the data storage device and interrupt or other signal is transmitted from the targeted data storage device(s) to the main controller 130 to signal that the read data is ready for transfer. However, in some embodiments, the fact that the read data is ready for transfer from the data storage device's allocated buffer is determined by the main controller 130 polling the targeted data storage device(s) to determine the completion status of the cloned read command. Finally, notice of completion of the read command is transmitted (562) when the data has been transferred from the data storage device's buffer to the host buffer.

Figure 5D:
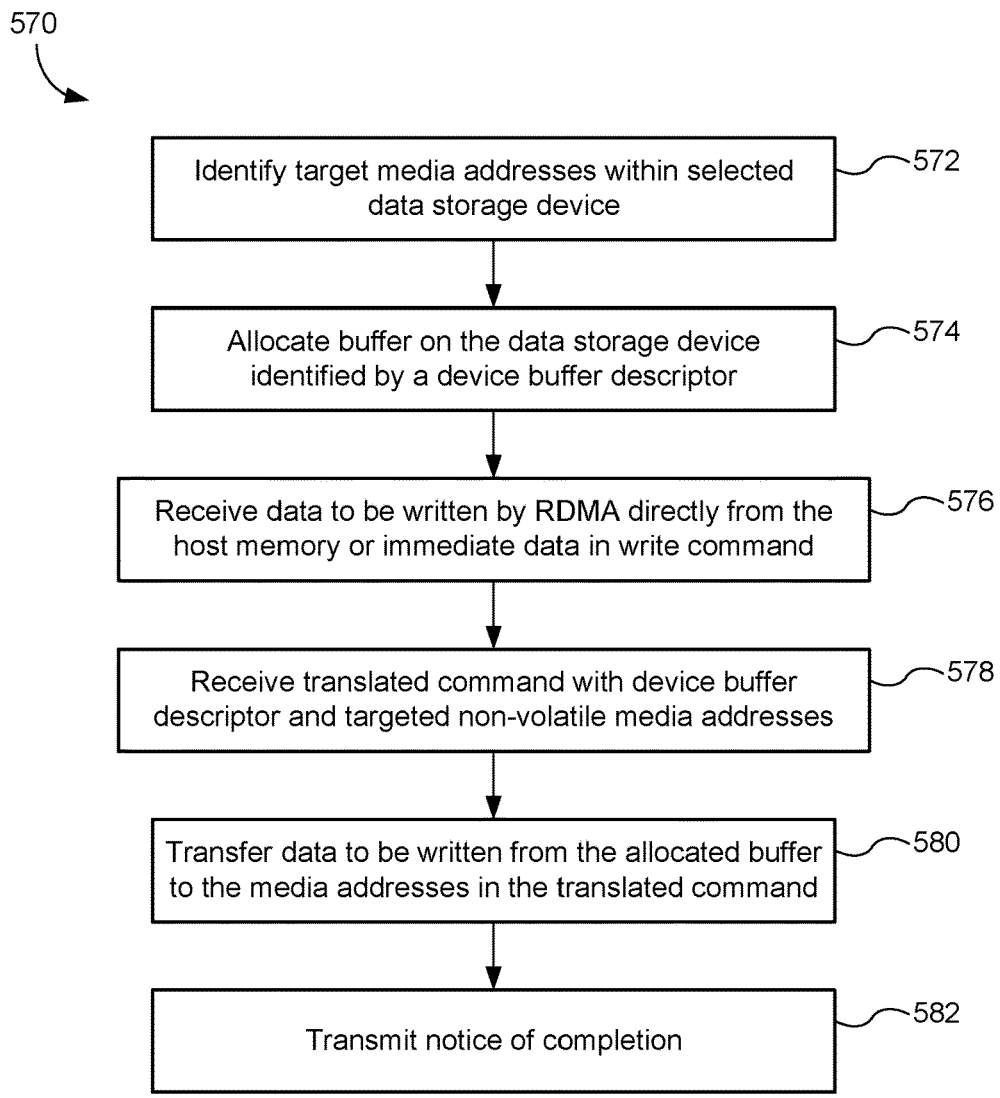

FIG. 5D depicts a method 570 of processing a write command (e.g., a write command sent by a host 110, see FIG. 1A) that may be implemented on a data storage device 120 working with a separate main controller 130 (e.g., see FIG. 1A). In method 570, the data storage device receives (572) address information associated with a write command and identifies that it is a target for the write command. The targeted data storage device thereafter allocates (574) a buffer to receive data to be written to locations in the target data storage device's non-volatile media specified by, or corresponding to, address information in the write command. Alternatively, the buffer may be pre-allocated prior to receipt of the write command. The data to be written is then received (576) directly from the host buffer (or from the immediate data in the case of a write immediate command) through a RDMA process, which is typically initiated by main controller 130. The data storage device receives (578) a cloned write command specifying the memory addresses in the non-volatile media and the buffer identified by the device buffer descriptor. The device buffer descriptor replaces the host buffer descriptor or the immediate data of the write command. Thereafter the data is transferred (580) from the allocated buffer to the non-volatile media specified by the memory addresses in the cloned command. In some embodiments, notice of completion is transmitted (582) when the data has been transferred from the data storage device's buffer.

In some embodiments, the allocated buffer is battery backed or otherwise non-volatile, and the targeted data storage device includes power fail mechanisms to ensure that any data stored in its buffers is not lost in the event of a power failure. In some such embodiments, once the data is successfully copied or transferred from the host buffer to the allocated buffer, the write command is assumed to have been successfully completed. As a result, a notice of completion is not transmitted (582) when the data has been transferred from the data storage device's buffer; however, in some such embodiments, a notice of completion is transmitted by main controller 130 to the host device which send the write command when the RDMA transfer of data from the host buffer to the allocated buffer is completed.

Figure 6:
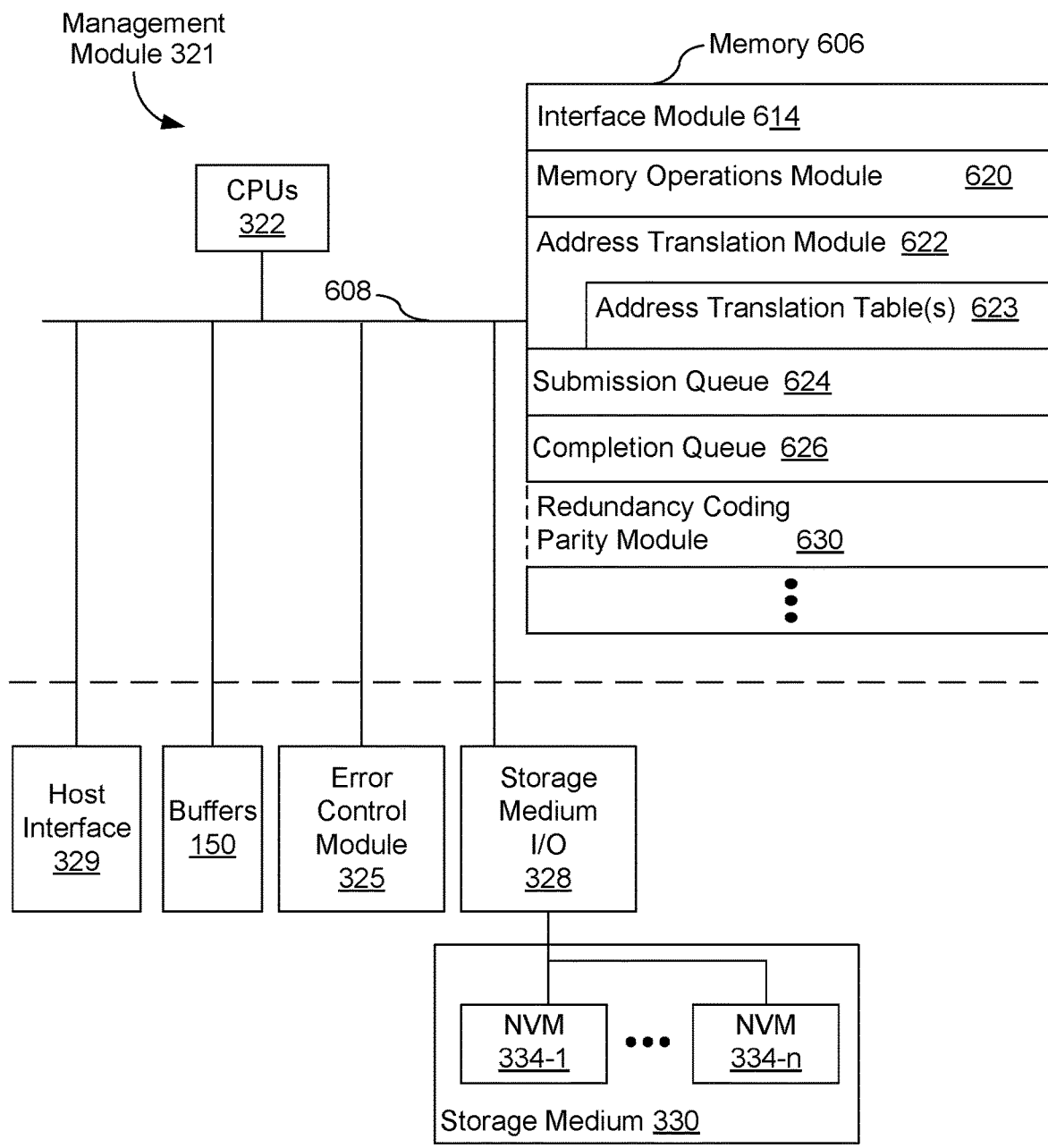
FIG. 6 depicts a block diagram of a memory management unit of a data storage device that is part of a non-volatile memory system, in accordance with some embodiments.

FIG. 6 depicts a block diagram of a management module 321, within a storage controller 324 of a data storage device 120 (e.g., a solid state drive) that is part of a non-volatile memory system 100 (FIG. 1A), in accordance with some embodiments. Thus, in some embodiments, each data storage device 120 of a non-volatile memory system 100 includes an instance of management module 321, which in some other embodiments, only some (e.g., one or more, or two or more) of the data storage device 120 of non-volatile memory system 100 include an instance of management module 321.

Referring to FIG. 6, management module 321 includes one or more processing units 322 (further described above with reference to FIG. 3), coupled to memory 606, a host interface 329, buffers 150, error control module 325 and storage medium interface 328 over data connections 608. Additional elements may be included in the storage controller but are not shown here for brevity. Management module 321 controls access to the non-volatile media on its associated sold state drive.

Memory 606, sometimes called controller memory, includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 606 optionally includes one or more storage devices remotely located from processor(s) 322. Memory 606, or alternately the non-volatile memory device(s) within memory 606, comprises a non-transitory computer readable storage medium. In some embodiments, memory 606, or the computer readable storage medium of memory 606 stores the following programs, modules, and data structures, or a subset or superset thereof:

- Interface module 614 used for communicating with main controller 130 via host interface 329, and optionally other components such as non-volatile memory devices 334 via storage medium interface 328 and error control module 325.
- A memory operations module 620 that executes read and write commands (sometimes herein called translated commands) received from main controller 130, and optionally allocates buffers 150 for receiving data to be stored in the data storage device and for receiving data read from the data storage device. In some other embodiments, main controller 130 allocates buffers 150. Execution of a respective write command includes writing data in one or more buffers 150 (allocated for storing the write data) into non-volatile storage medium 330. Execution of a respective read command includes reading data from non-volatile storage medium 330 to one or more buffers 150 allocated for execution of the read command. In some embodiments, each received read and write command is stored in a submission queue 624 until execution of the command by the data storage device is completed, after which it is moved to a completion queue 626. In some embodiments, after transfer of read data from buffers 150 to the requesting host system using RDMA, in the case of read commands, and after notification of execution completion in the case of write commands, the completed command is removed from completion queue.
- In some embodiments, an Address Translation module 622 translates logical addresses in received (translated) commands into physical addresses in the physical address space of the data storage device, and updates one or more address translation tables 623 to keep track of the correspondence between logical and physical addresses. In some embodiments, address translation is performed by main controller 130 instead of the individual storage devices.
- One or more submission queues 624 may be used to store status information regarding translated read and write commands received from hosts 110, the execution of which has not yet been completed; and
- One or more completion queues 626 may be used to store completion information regarding translated read and write commands received from hosts 110, the execution of which has been completed, which completion information may be propagated back to the hosts that sent the original commands.

Optionally, in some embodiments, memory 606, or the computer readable storage medium of memory 606 also stores a Redundancy Coding parity module 630, for computing and storing parity information in storage medium 330 of the data storage device 120 in which management module 321 resides.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of processing memory access requests in a non-volatile memory system comprising a main controller and a plurality of data storage devices, the method comprising:
    at the main controller, receiving, from a host device external to the non-volatile memory system, a write request to write data, the write request including a host buffer descriptor pointing to a memory location in a buffer of the host device;
    in response to receiving the write request, the main controller performing a sequence of operations, including:
        identifying a data storage device of the plurality of data storage devices to which to write data, the identified data storage device being a data storage device targeted for data storage by the write request and including a controller, non-volatile memory and a storage data buffer;
        allocating buffer space in the storage data buffer of the identified data storage device for temporarily storing data to be written to the identified data storage device in accordance with the write request;
        translating the write request, including modifying the host buffer descriptor into a device buffer descriptor to point to the allocated buffer space in the storage data buffer of the identified storage device;
        initiating execution of a remote direct memory access (RDMA) data transfer from the memory location in the host device, specified by the host buffer descriptor included in the write request, to the allocated buffer space in the identified data storage device specified by the device buffer descriptor;
        generating, based on the translated write request and allocated buffer space, a write command to be executed by the controller internal to the identified data storage device, the write command including the device buffer descriptor that points to the allocated buffer space in the storage data buffer of the identified storage device; and
        upon completion of the RDMA data transfer, transferring the generated write command that includes the device buffer descriptor that points to the allocated buffer space in the storage data buffer of the identified storage device to the identified data storage device; and
    at the identified data storage device, executing the generated write command so as to write data from the allocated buffer space in the data buffer of the identified data storage device to non-volatile memory in the identified data storage device.

2. The method of claim 1, wherein each data storage device of the plurality of data storage device in the non-volatile memory system includes:
    non-volatile memory for durably storing information;
    one or more data buffers for temporarily storing information being written to or read from the non-volatile memory of the data storage device; and
    a storage controller for controlling operation of the data storage device, including execution of read and write commands.

3. The method of claim 2, wherein:
    the non-volatile memory of each data storage device of the plurality of data storage devices comprises flash memory; and
    the one or more data buffers of each data storage device of the plurality of data storage devices comprises non-volatile random access memory (RAM).

4. The method of claim 1, wherein the write request is a first write request, the host device is a first host device, the identified data storage device is a first identified data storage device, the RDMA data transfer is a first RDMA data transfer, and the method further comprises:
    at the main controller, receiving, from a second host device external to the non-volatile memory system, a second write request to write data; and
    in response to receiving the second write request, the main controller further performing a sequence of operations, including:
        initiating execution of a second remote direct memory access (RDMA) data transfer from a memory location in the second host device, specified by the second write request, to buffer space in a second identified data storage device, wherein execution of the second RDMA data transfer overlaps execution of the first RDMA data transfer.

5. The method of claim 4, wherein the main controller is configured to concurrently execute four or more overlapping RDMA data transfers, each RDMA data transfer comprises an RDMA transfer of data between a respective host device and a respective data storage device of the plurality of data storage devices.

6. The method of claim 1, wherein the write command generated by the main controller includes a source location corresponding to the allocated buffer space.

7. The method of claim 1, wherein identifying the data storage device includes identifying the data storage device in accordance with a name space specified by the received write request.

8. The method of claim 1, wherein the write request is a first write request, the host device is a first host device, the identified data storage device is a first identified data storage device and the RDMA data transfer is a first RDMA data transfer, the method further comprising:
at the main controller, receiving, from a second host device external to the non-volatile memory system, a read request to read data;
in response to receiving the read request, the main controller further performing a sequence of operations, including:
identifying a second data storage device of the plurality of data storage devices from which to read data, the identified data storage device including a controller, non-volatile memory and a data buffer;
allocating buffer space in the data buffer of the second identified data storage device for temporarily storing data read from the identified data storage device in accordance with the read request;
generating, based on the read request and allocated buffer space, a read command to be executed by the controller internal to the second identified data storage device; and
issuing the generated read command to the second identified data storage device; and
after execution of the read command by the second identified data storage device, initiating execution of a second remote direct memory access (RDMA) data transfer from the allocated buffer space in the second identified data storage device to a memory location in the second host device specified by the read request.

9. The method of claim 8, wherein execution of the second RDMA data transfer from the allocated buffer space in the second identified data storage device to the memory location in the second host device overlaps with execution of the first RDMA data transfer from the first host device to the first identified data storage device.

10. The method of claim 8, wherein generating the read command includes:
cloning the received read request; and
replacing a host buffer descriptor in the read request copy with a device buffer descriptor corresponding to the allocated buffer space in the data buffer of the second identified data storage device.

11. The method of claim 1, wherein generating the write command includes:
generating a copy of the write request; and
replacing a host buffer descriptor in the write request copy with a device buffer descriptor corresponding to the allocated buffer space in the data buffer of the identified data storage device.

12. A memory controller, comprising:
a storage interface for coupling the memory controller to a plurality of data storage devices;
a host interface for receiving, from one or more host devices external to the memory controller, write requests and read requests, each write request comprising (i) a request to write data from a respective host device to a respective data storage device and (ii) a host buffer descriptor pointing to a memory location in a buffer of the host device, and each read request comprising a request to read data from a respective data storage device and convey the read data to a respective host device; and
a write request processing module for processing a respective write request from a respective host device by performing a sequence of operations, including:
identifying a data storage device of the plurality of data storage devices to which to write data, the identified data storage device being a data storage device targeted for data storage by the write request and including a controller internal to the identified data storage device, non-volatile memory and a storage data buffer;
allocating buffer space in the storage data buffer of the identified data storage device for temporarily storing data to be written to the identified data storage device in accordance with the write request;
translating the write request, including modifying the host buffer descriptor into a device buffer descriptor to point to the allocated buffer space in the storage data buffer of the identified storage device;
initiating execution of a remote direct memory access (RDMA) data transfer from the memory location in the respective host device, specified by the host buffer descriptor included in the respective write request, to the allocated buffer space in the identified data storage device specified by the device buffer descriptor;
generating, based on the translated respective write request and allocated buffer space, a write command to be executed by the controller internal to the identified data storage device, the write command including the device buffer descriptor that points to the allocated buffer space in the storage data buffer of the identified storage device; and
upon completion of the RDMA data transfer, transferring the generated write command that includes the device buffer descriptor that points to the allocated buffer space in the storage data buffer of the identified storage device to the identified data storage device for execution at the identified data storage device, thereby causing data to be written from the allocated buffer space in the data buffer of the identified data storage device to non-volatile memory in the identified data storage device.

13. The memory controller of claim 12, wherein each data storage device of the plurality of data storage devices includes:
non-volatile memory for durably storing information;
one or more data buffers for temporarily storing information being written to or read from the non-volatile memory of the data storage device; and
a storage controller for controlling operation of the data storage device, including execution of read and write commands.

14. The memory controller of claim 13, wherein:
the non-volatile memory of each data storage device of the plurality of data storage devices comprises flash memory; and
the one or more data buffers of each data storage device of the plurality of data storage devices comprises non-volatile random access memory (RAM).

15. The memory controller of claim 12, wherein the respective write request is a first write request, the respective host device is a first host device, the identified data storage device is a first identified data storage device and the RDMA data transfer is a first RDMA data transfer, and wherein the sequence of operations further includes:

receiving, from a second host device external to the memory controller, a second write request to write data;

in response to receiving the second write request, performing a further sequence of operations, including initiating execution of a second remote direct memory access (RDMA) data transfer from a memory location in the second host device, specified by the second write request, to buffer space in a second identified data storage device, wherein execution of the second RDMA data transfer overlaps execution of the first RDMA data transfer.

16. The memory controller of claim 12, wherein the memory controller is configured to concurrently execute four or more overlapping RDMA data transfers, each RDMA data transfer comprises an RDMA transfer of data between a respective host device and a respective data storage device of the plurality of data storage devices.

17. The memory controller of claim 12, wherein the identified data storage device is a first identified data storage device, the RDMA data transfer is a first RDMA data transfer, and the memory controller further comprises a read request module for processing a respective read request from a second host device external to the memory controller by performing a sequence of operations, including:

identifying a second data storage device of the plurality of data storage devices from which to read data, the identified data storage device including a controller internal to the second identified data storage device, non-volatile memory and a data buffer;

allocating buffer space in the data buffer of the second identified data storage device for temporarily storing data read from the identified data storage device in accordance with the read request;

generating, based on the read request and allocated buffer space, a read command to be executed by the controller internal to the second identified data storage device; and issuing the generated read command to the second identified data storage device; and after execution of the read command by the second identified data storage device, initiating execution of a second remote direct memory access (RDMA) data transfer from the allocated buffer space in the second identified data storage device to a memory location in the second host device specified by the read request.

18. The memory controller of claim 17, wherein execution of the second RDMA data transfer from the allocated buffer space in the second identified data storage device to the memory location in the second host device overlaps with execution of the first RDMA data transfer from the first host device to the first identified data storage device.

19. The memory controller of claim 12, wherein generating the write command includes generating a copy of the respective write request, and replacing a host buffer descriptor in the write request copy with a device buffer descriptor corresponding to the allocated buffer space in the data buffer of the identified data storage device.

20. A storage system, comprising:
a plurality of data storage devices; and
a memory controller, the memory controller including:
a storage interface including means for coupling the memory controller to the plurality of data storage devices;
a host interface including means for receiving, from one or more host devices external to the memory controller, write requests and read requests, each write request comprising (i) a request to write data from a respective host device to a respective data storage device and (ii) a host buffer descriptor pointing to a memory location in a buffer of the host device, and each read request comprising a request to read data from a respective data storage device and convey the read data to a respective host device; and
a write request processing module including means for processing a respective write request from a respective host device by performing a sequence of operations, including:
means for identifying a data storage device of the plurality of data storage devices to which to write data, the identified data storage device being a data storage device targeted for data storage by the write request and including a controller internal to the identified data storage device, non-volatile memory and a storage data buffer;
means for allocating buffer space in the storage data buffer of the identified data storage device for temporarily storing data to be written to the identified data storage device in accordance with the write request;
means for translating the write request, including modifying the host buffer descriptor into a device buffer descriptor to point to the allocated buffer space in the storage data buffer of the identified storage device;
means for initiating execution of a remote direct memory access (RDMA) data transfer from the memory location in the respective host device, specified by the host buffer descriptor included in the respective write request, to the allocated buffer space in the identified data storage device specified by the device buffer descriptor;
means for generating, based on the translated respective write request and allocated buffer space, a write command to be executed by the controller internal to the identified data storage device, the write command including the device buffer descriptor that points to the allocated buffer space in the storage data buffer of the identified storage device; and
upon completion of the RDMA data transfer, means for transferring the generated write command that includes the device buffer descriptor that points to the allocated buffer space in the storage data buffer of the identified storage device to the identified data storage device for execution at the identified data storage device, thereby causing data to be written from the allocated buffer space in the data buffer of the identified data storage device to non-volatile memory in the identified data storage device.

21. A non-transitory computer readable storage medium storing one or more programs configured for execution by a memory controller configured to be coupled to one or more host devices and a plurality of data storage devices, the one or more programs comprising instructions that when executed by one or more processors of the memory controller, cause the memory controller to:

receive, from the one or more host devices external to the memory controller, write requests and read requests, each write request comprising (i) a request to write data from a respective host device to a respective data storage device and (ii) a host buffer descriptor pointing to a memory location in a buffer of the host device, and each read request comprising a request to read data from a respective data storage device and convey the read data to a respective host device; and process a respective write request from a respective host device by performing a sequence of operations, including:

identifying a data storage device of the plurality of data storage devices to which to write data, the identified data storage device being a data storage device targeted for data storage by the write request and including a controller, non-volatile memory and a storage data buffer;

allocating buffer space in the storage data buffer of the identified data storage device for temporarily storing data to be written to the identified data storage device in accordance with the write request;

translating the write request, including modifying the host buffer descriptor into a device buffer descriptor to point to the allocated buffer space in the storage data buffer of the identified storage device;

initiating execution of a remote direct memory access (RDMA) data transfer from the memory location in the respective host device, specified by the host buffer descriptor included in the respective write request, to the allocated buffer space in the identified data storage device specified by the device buffer descriptor;

generating, based on the translated respective write request and allocated buffer space, a write command to be executed by the controller internal to the identified data storage device, the write command including the device buffer descriptor that points to the allocated buffer space in the storage data buffer of the identified storage device; and upon completion of the RDMA data transfer, transferring the generated write command that includes the device buffer descriptor that points to the allocated buffer space in the storage data buffer of the identified storage device to the identified data storage device.

22. The method of claim 1, wherein:

the main controller includes a stripe map engine that works in conjunction with a stripe map or a stripe function for performing the step of identifying the data storage device of the plurality of data storage devices to which to write data.

\* \* \* \* \*